(12) United States Patent
Smith et al.

(10) Patent No.: US 6,932,286 B2
(45) Date of Patent: Aug. 23, 2005

(54) COMBINATION DROP AND BROADCAST SPREADER

(76) Inventors: Fred P. Smith, 228 S. Scenic Dr., Alpine, UT (US) 84004; Todd Mendenhall, 11832 S. Kinney Cir., Riverton, UT (US) 84065

( * ) Notice: Subject to any disclaimer, the term of this patent is extended or adjusted under 35 U.S.C. 154(b) by 207 days.

(21) Appl. No.: 10/290,064

(22) Filed: Nov. 7, 2002

(65) Prior Publication Data

US 2003/0098373 A1 May 29, 2003

Related U.S. Application Data

(60) Provisional application No. 60/337,701, filed on Nov. 7, 2001, and provisional application No. 60/340,748, filed on Nov. 30, 2001.

(51) Int. Cl.$^7$ ................................................ A01C 15/00
(52) U.S. Cl. ............................................................ 239/650
(58) Field of Search ................................ 239/650, 652, 239/665, 659, 668, 673, 679, 680, 681

(56) References Cited

U.S. PATENT DOCUMENTS

| | | | | |
|---|---|---|---|---|
| 876,727 A | * | 1/1908 | Pevey ............................ | 15/84 |
| 3,401,889 A | | 9/1968 | Parker .......................... | 239/666 |
| 3,537,649 A | | 11/1970 | van der Lely et al. ...... | 239/666 |
| 3,693,890 A | | 9/1972 | Torrey ........................... | 239/668 |
| 3,703,260 A | | 11/1972 | Grabske ...................... | 239/666 |
| 4,166,581 A | | 9/1979 | Hetrick ........................ | 239/683 |
| 4,261,520 A | | 4/1981 | Hetrick ........................ | 239/657 |
| 4,511,090 A | | 4/1985 | Morgan ........................ | 239/666 |
| 4,573,636 A | * | 3/1986 | Dilworth et al. .............. | 239/2.2 |
| 4,588,113 A | * | 5/1986 | Egerdahl ...................... | 239/663 |
| 4,588,133 A | | 5/1986 | Brabb et al. ................. | 239/681 |
| 4,597,531 A | | 7/1986 | Kise ............................. | 239/650 |
| 4,693,122 A | | 9/1987 | Griffith ........................ | 73/861 |
| 4,763,844 A | | 8/1988 | van der Lely et al. ...... | 239/665 |
| 4,911,831 A | * | 3/1990 | Davison et al. ............... | 210/86 |
| 5,019,302 A | * | 5/1991 | Sparks et al. .................. | 264/8 |
| 5,100,592 A | * | 3/1992 | Sparks et al. ................. | 264/7 |
| 5,181,804 A | * | 1/1993 | Wysong et al. .............. | 406/67 |
| 5,203,510 A | | 4/1993 | Courtney et al. ........... | 239/667 |
| 5,299,888 A | * | 4/1994 | Wysong et al. .............. | 406/67 |
| 5,307,952 A | | 5/1994 | Worrel et al. ................. | 222/1 |
| 5,370,321 A | | 12/1994 | Bianco ....................... | 239/666 |
| 5,385,306 A | * | 1/1995 | Cervenka .................... | 239/663 |
| 5,511,326 A | * | 4/1996 | Liebrecht, Jr. ................ | 37/93 |
| 5,618,002 A | | 4/1997 | Cervelli et al. ............. | 239/657 |
| 5,647,476 A | | 7/1997 | Veenhof .................... | 198/497 |
| 5,755,387 A | | 5/1998 | Hedrick ...................... | 239/657 |
| 5,797,477 A | | 8/1998 | Veenhof .................... | 198/499 |

(Continued)

FOREIGN PATENT DOCUMENTS

| EP | 000330920 A1 | * | 9/1989 |
| GB | 2150802 A | * | 7/1985 |

OTHER PUBLICATIONS

Terra Topper, http://www.reelturf.com/terratopper.htm, Jul. 2, 2001, p. 1.

(Continued)

Primary Examiner—Harry B. Tanner
Assistant Examiner—Mohammad M. Ali
(74) Attorney, Agent, or Firm—Pate Pierce & Baird

(57) ABSTRACT

A spreader for distributing a material on a surface. In certain embodiments, the spreader may include a disk rotatable about an axis and having an upper surface extending substantially radially from the axis. A driver may operably connect to the disk to provide rotation about the axis. A paddle may secure to the upper surface of the disk and rotate therewith. The paddle may be aligned to rotationally engage particulate material directed thereto and generate a centrifugal acceleration therein. A controller may limit the centrifugal release of the particulate material from the apparatus.

17 Claims, 21 Drawing Sheets

U.S. PATENT DOCUMENTS

| | | | | |
|---|---|---|---|---|
| 5,797,793 A | * | 8/1998 | Matousek et al. | 460/111 |
| 5,823,734 A | | 10/1998 | Hagemeyer et al. | 414/519 |
| 5,842,648 A | | 12/1998 | Havlovitz et al. | 239/650 |
| 5,890,867 A | | 4/1999 | Hagemeyer | 414/519 |
| 5,967,427 A | | 10/1999 | Seymour | 239/676 |
| 5,988,535 A | | 11/1999 | Kime | 239/687 |
| 5,992,134 A | * | 11/1999 | Blide et al. | 56/16.8 |
| 6,047,909 A | | 4/2000 | Simpson | 239/687 |
| 6,058,860 A | | 5/2000 | Kinkead et al. | 111/11 |
| 6,116,526 A | | 9/2000 | Bom et al. | 239/682 |
| 6,149,079 A | | 11/2000 | Kinkead et al. | 239/668 |
| 6,186,731 B1 | | 2/2001 | Vickers et al. | 414/519 |
| 6,202,944 B1 | | 3/2001 | McCrory | 239/658 |
| 6,206,302 B1 | | 3/2001 | Hansen et al. | 239/289 |
| 6,209,808 B1 | | 4/2001 | Anderson | 239/682 |
| 6,220,532 B1 | | 4/2001 | Manon et al. | 239/672 |
| 6,224,161 B1 | | 5/2001 | Hansen et al. | 298/17 T |
| 6,238,004 B1 | | 5/2001 | Hansen et al. | 298/17 T |

OTHER PUBLICATIONS

Turfco Tow Type Broadcast Top Dresser, http://www.turfco.com/html/body_sp_1530.htm, Nov. 1, 2001, pp. 1–2.

Turfco Tow–Type Broadcast Top Dresser, http://www.hvcarter.com/Turfco.htm, Jul. 2, 2001, p. 1.

Turfco Top Dresser, Broadcast Spreader and Material Handler, http://www.turfco.com/html/body_la4.htm, Jul. 2, 2001, pp. 1–2.

Millcreek Manufacturing– Topdresser/Spreader, http://www.millcreekmfg.com/index.cfm?CategoryID=7&do=list, Jul. 2, 2001, p. 1.

Topdresser 2500, http://www.toro.com/golf/turf/multipro/td2500.html, Jul. 2, 2001, pp. 1–2.

Dakota Turf Tender 410 Towable, http://www.dakotapeat.com/410tow.htm, Mar. 4, 2003, p. 1.

Dakota Turf Tender 410 Vehicle, http://www.dakotapeat.com/410veh.htm, Mar. 4, 2003, p. 1.

Dakota Turf Tender 410 Vehicle Mount, http://www.dakotapeat.com/410v–1.htm, Aug. 1, 2001, p. 1.

Dakota Turf Tender 410 Towable, http://www.dakotapeat.com/410t–2.htm, Aug. 1, 2001, p.1.

Dakota Turf Tender 410 Towable, http://www.dakotapeat.com/410t–4.htm, Aug. 1, 2001, p.1.

Dakota Turf Tender 420 Opinions, http://www.dakotapeat.com/440op.htm, Mar. 4, 2003, p. 1.

Dakota Turf Tender 420, http://www.dakotapeat.com/420.htm, Mar. 4, 2003, p. 1.

Dakota Turf Tender 440, http://www.dakotapeat.com/440.htm, Mar. 4, 2003, p. 1.

Dakota Turf Tender 440, http://www.dakotapeat.com/440–6.htm, Aug. 1, 2001, p. 1.

Dakota Turf Tender 440 Options, http://www.dakotapeat.com/440op.htm, Mar. 4, 2003, p. 1.

Dakota Turf Tender 440 Options, http://www.dakotapeat.com/440op–1.htm, Aug. 1, 2001, p. 1.

Dakota Turf Tender 440 Options, http://www.dakotapeat.com/440op–2.htm, Aug. 1, 2001, p. 1.

* cited by examiner

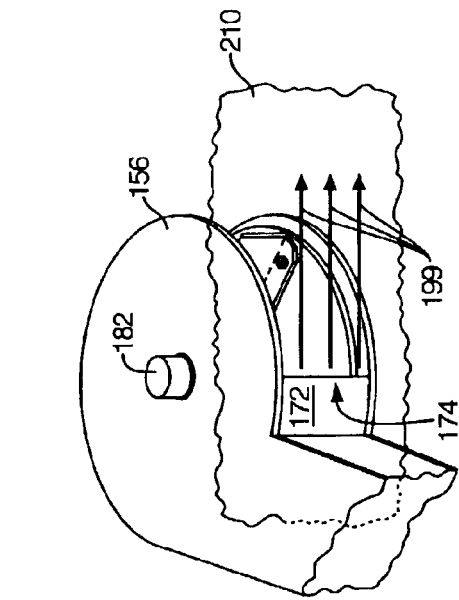
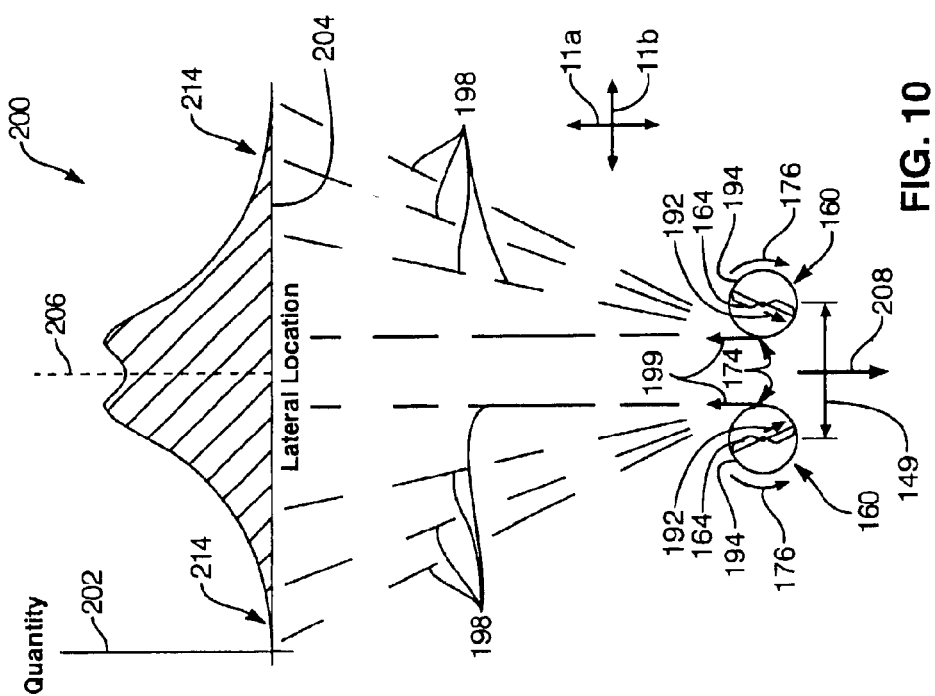
FIG. 11
FIG. 10

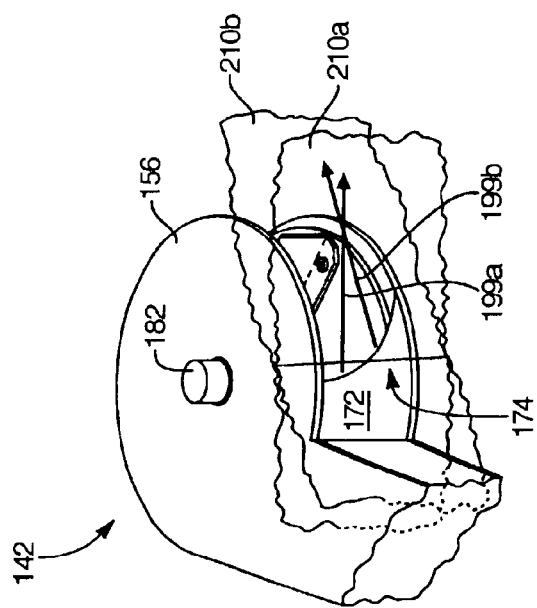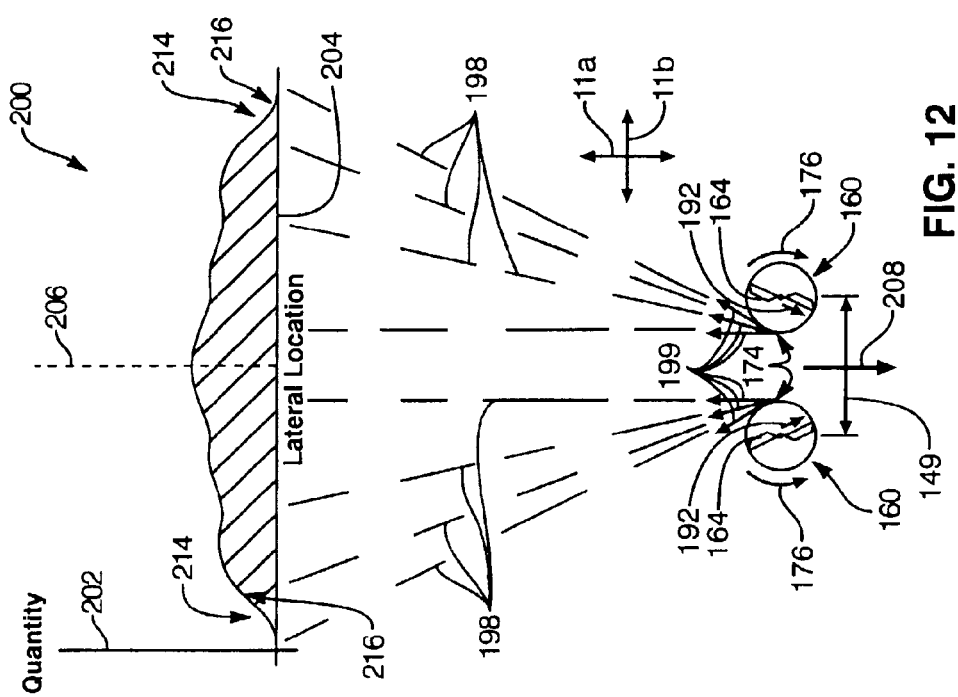

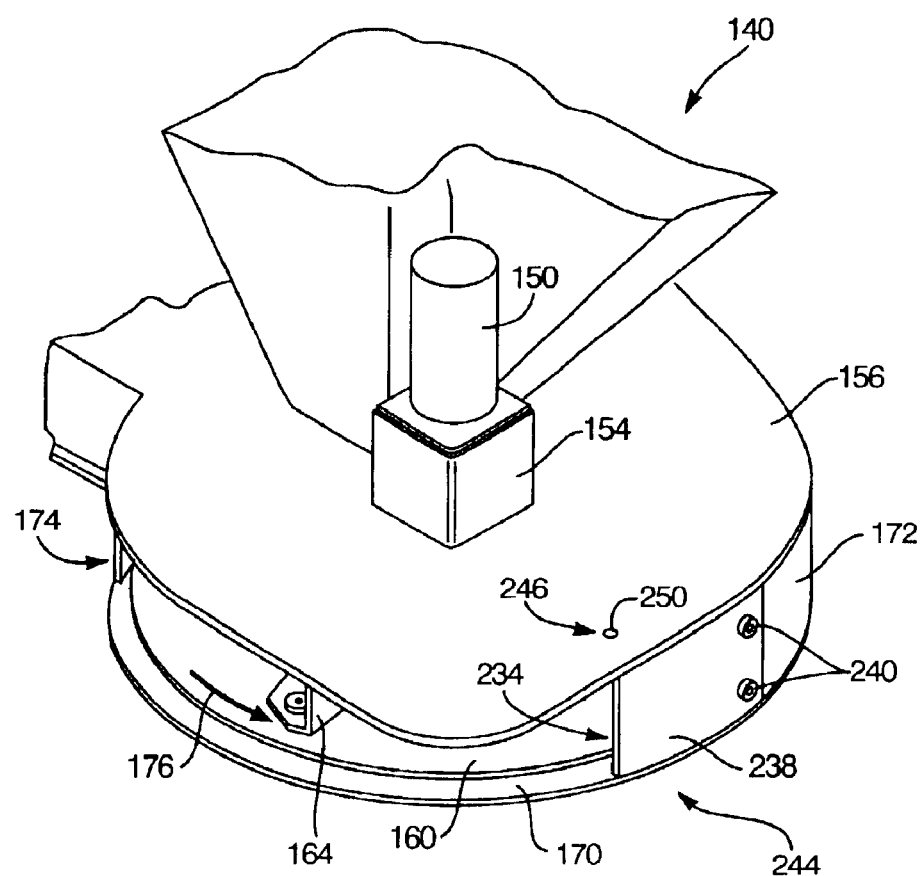
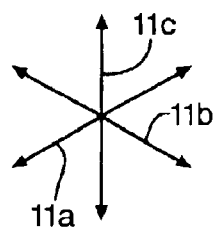
FIG. 23

COMBINATION DROP AND BROADCAST SPREADER

RELATED APPLICATIONS

This application claims priority to U.S. Provisional Patent Application Ser. No. 60/337,701, filed on Nov. 7, 2001, entitled COMBINATION DROP AND BROADCAST SPREADER FOR SPREADING GRANULAR MATERIAL and U.S. Provisional Patent Application Ser. No. 60/340,748, filed on Nov. 30, 2001, entitled SAFETY SHIELD FOR ROTATING SPINNER.

BACKGROUND

1. The Field of the Invention

This invention relates to transporting and distributing particulate material and, more particularly, to novel systems and methods for drop and broadcast spreading of materials used in turf care.

2. The Background Art

Agrarians have always been interested in efficiently managing their land. Common land management tasks include spreading substances such as seed, water, fertilizer, and the like. The quality of the land and its produce often depend on the even distribution of these vital substances. Uneven distributions result in waste and may even hinder or halt the progress of the desired vegetation. For these reasons, agrarians have developed various spreaders to rapidly and evenly distribute seed, fertilizer, water, sand, other soil amendments, and the like, thus, providing improved or ideal conditions for the vegetation of their choice.

In modern times, spreaders have been applied to the treatment of lawns and turf, particularly for parks, athletic fields, golf courses, and the like. Modern spreaders are also used for other purposes such as distributing cinders, salt, sand or other de-icing materials on winter roads. Broadcast spreaders and drop spreaders are the most common varieties of spreaders. A broadcast spreader typically includes one or more rotating spinners. The rotation of the spinner generates a centrifugal acceleration in the material deposited thereon, resulting in an arcuate distribution upon tangential release. In larger capacity models, broadcast spreaders often rely on a conveyor to deliver material to the spinners. Broadcast spreaders are suited for applications involving smaller amounts of material spread over large areas. For example, broadcast spreaders are often helpful in spreading fertilizer, pesticide, seed, top-dressing material, and the like.

Drop spreaders typically distribute a material by simply dropping it through one or more apertures directly onto a ground surface. On larger capacity models, a conveyor may assist in the removal of the material from a hopper. A conveyor may also assist in the metering out of the material. Drop spreaders are well suited for spreading larger amounts of material over a limited width. Typically, drop spreaders only distribute the material across a width roughly equivalent to the width of the spreader itself. Drop spreaders are often used as top dressers to apply a layer of sand, topsoil, gravel, or the like.

Recent advances in turf care, particularly golf green care, suggest that lighter more frequent applications of selected materials maximize turf quality. Broadcast spreaders are particularly well suited for such light applications if they can provide uniformity. However, there are still many applications that require a heavier, more controlled application of material. Heavy applications often require a drop spreader. As a result, combination drop and broadcast spreaders have been introduced.

While an improvement, combination spreaders are still susceptible to many of the weaknesses associated with the individual drop and broadcast spreading machines. Additionally, combination spreaders encounter difficulty in handling the wide variety of materials that are distributed by both drop and broadcast spreading devices.

Top-dressing materials used on sports turf and golf fairways and greens typically have some combination of sand, silt, clay, peat, lime, gypsum, and/or soil. When the moisture content is high, top-dressing material becomes cohesive and resistant to flow. As a result, it becomes more difficult to remove the material from the hopper and provide a consistent metering. Consequently, conveyors having chevron, herringbone, or other raised patterns on the surface have been introduce to assist in drawing the top-dressing material from the hopper though a metering port.

Conveyors with raised patterns cause two problems. First, the wet mixture clings to the conveyor between the raised portions of the surface pattern. Instead of falling off the conveyor as desired, the top-dressing material often sticks to the carrier. When top-dressing material does fall off the conveyor, it often does so in uneven clumps. Removal of the top-dressing material from conveyors with raised patterns has proven to be a difficult challenge. A simple scraper does not work well with raised patterns. Other more effective removal devices are complicated and inhibit the addition of other distributing attachments.

A second problem occurs when all of the recesses between the raised patterns become filled with top-dressing material. In effect, a conveyor with recesses filled acts just like a smooth conveyor. As a result, the device again is faced with the challenge of drawing the moist top-dressing material from the hopper with consistent metering.

Other challenges of combination spreaders must be addressed regardless of the moisture content of the material to be distributed. For example, maintaining a desired distribution pattern of equal density is another common challenge. Much effort has been invested in producing an even lateral (i.e. side to side with respect to the direction of travel) distribution. For example, if a broadcast type spreader is used to apply top-dressing material to a golf green, any uneven distribution will soon be noticeable. Moreover, as uneven applications accumulate, the problem is exacerbated and the result must be corrected with considerable difficulty.

Another challenge in combination spreader design relates to loading heights. For ease of loading, it is advantageous to minimize the loading height. However, low profile spreaders have difficulty maintaining a sufficient trailing clearance. The trailing clearance is the spacing from the tires to the lowest part of the spreader behind the tires. A sufficient trailing clearance is necessary to avoid damaging turf, or the spreader itself, as the spreader is moved on and off of elevated greens and through undulations.

Trailing clearance and other operational constraints are often at odds or balanced with one another with difficulty. For example, converting a drop spreader to a broadcast spreader often entails the addition of a funnel. Typically, twin spinners are employed on a broadcast spreader. Often the spinners are placed adjacent one another. Funnel height restriction, imposed by overall height and trailing clearance considerations, often results in funnel angles so shallow that the wet, cohesive material sticks to the funnel walls stopping further flow.

Additionally, with typical spreaders, due to the larger number of variables, it is difficult to know how much material is actually being distributed at any given time. For example, a user may be faced with adjusting spinner speed, spinner angle with respect to the ground, metering-port dimensions, conveyor speed, and spreader speed to achieve a desired application. The characteristics of the material to be distributed must also be considered. These variables are too numerous for a user to take into consideration when trying to generate a desired application of material.

Safety considerations also present challenges to spreader design. Powered broadcast spreaders, for example, use rotating paddles to throw material in a wide pattern. Rotating paddles cannot be completely covered or protected without adversely affecting the function of the broadcast spreader. Rotating paddles are typically shielded on a portion of their periphery to control the spread pattern and direct the stream of the distributed material. If a user were to inadvertently put a foreign object such as a hand or foot in the path of a rotating paddle, the paddle would shear the foreign object as it passes by the edge of the shielding. On typical powered broadcast spreaders the shear point, where the paddle passes the edge of the shielding, is exposed and readily accessible to the user.

Various solutions have been proposed to lessen the danger of the exposed shear point. However, these proposed solutions do not remove the shear point. Rather, they act to merely impede access to the shear point. With such measures, if a hand or finger did inadvertently enter the path of the spinner at the shear point, significant damage would still occur. Meanwhile, obstructions to hands are often obstructions to distribution of the granular material.

The foregoing challenges and design considerations, as well as others, are addressed by the present invention.

BRIEF SUMMARY OF THE INVENTION

Consistent with the foregoing objects, and in accordance with the invention as embodied and broadly described herein, a method and apparatus are disclosed in one embodiment of the present invention as including a spreader having longitudinal, lateral, and transverse directions for distributing a material laterally and longitudinally on a surface during longitudinal travel of the spreader.

The spreader may include a hopper having a wall to contain a quantity of material. An aperture or hopper exit may be located proximate the bottom of the hopper. In one embodiment, the hopper exit may be located transversely lower than substantially all of the hopper to facilitate removal of the material from the hopper. A conveyor comprising a carrier powered by a driver may urge material passing through the hopper exit toward a metering port providing a consistent output of metered material.

A compression plate secured proximate the hopper exit may extend therefrom toward the carrier, forming a passage terminating at the metering port. The compression plate may be positioned at an angle with respect to the carrier. The angle may be selected to urge the material toward the carrier sufficiently to frictionally engage the material with the carrier and draw the material, metered, through the metering port. In selected embodiments, the compression plate comprises a material selected to provide with the material a lower effective coefficient of friction than the effective coefficient of friction between the material and the carrier.

A carrier in accordance with the present invention may be any suitable mechanism. For example, a carrier may be formed of a chain, a rack, a belt, a link belt, decks, and/or platens. In one embodiment, the carrier is formed as a continuous belt supported on rollers.

The outer surface of the carrier may engage the material as it is drawn past the compression plate and through the metering port. In certain embodiments, the outer surface of the carrier is substantially smooth to facilitate removal of all material adhering thereto. In selected embodiments, the smooth outer surface of the carrier supports the use of a scraper positioned to scrape the carrier and promote a complete and continuous deposition of all metered material onto the ground surface.

Various distributors may be attached to a spreader in accordance with the present invention. Suitable distributors may include spinners and roller brushes. Moreover, in selected embodiments, a distributor may be omitted, permitting the metered material to fall directly from the carrier to the ground surface as a "drop spreader" distribution.

A distributor with spinners in accordance with the present invention may have at least one funnel delivering material from the carrier to at least one spinner. The spinner may rotate and propel the material out onto the ground surface. In selected embodiments, a distributor may comprise two funnels delivering material to two rotating spinners.

Each spinner may define axial and radial directions orthogonal to one another. A disk may rotate about an axis extending in the axial direction. The upper surface of the disk may extend in the radial direction to receive the material thereon. A driver may provide rotation of the disk about the axis. One or more paddles may be secured to the upper surface of the disk to extend in the axial direction therefrom and rotate therewith. The one or more paddles may be positioned to rotationally engage the material deposited on the upper surface of the disk and generate a centrifugal acceleration therein. A shroud may provide a gradually decreasing barrier to the centrifugal release of the material from the disk, thus, generating a more even distribution of the material on the ground surface.

In certain embodiments, the orientation of the paddles with respect to the disk may be selected to provide an optimum distribution for a particular material. For example, one or more paddles may be secured by an adjustment mechanism to the upper surface of the disk. The adjustment mechanism may provide multiple angles, with respect to a radius of a disk, at which the paddle may be substantially rigidly secured to the disk. Applicants have discovered that as few as two paddles may suffice, and more paddles may be used.

Various guards may be incorporated to remove, or substantially reduce the risk of, pinch points between the rotating paddles and the stationary shroud. For example, a flexible guard may be secured to the shroud at the pinch point. The flexible guard may deflect when a foreign object is pushed thereagainst by a paddle. In certain embodiments, the flexible guard may be positioned to generate a restoring force urging the flexible guard to return to a natural position. The natural position may be manipulated so that the restoring force, once the flexible guard is deflected, may have the effect of urging the foreign object away from the pinch point.

A roller brush distributor in accordance with the present invention may comprise a roller brush rotating about an axis extending in the lateral direction. The roller brush may be positioned to contact the metered material resting on the carrier so as to propel the metered material downward toward the ground surface.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 10 is a top view of two spinners and the flight paths and a possible distribution curve generated thereby;

FIG. 11 is a partial, perspective view of an embodiment of a spinner and abrupt release edge capable of generating the distribution curve of FIG. 10;

FIG. 12 is a top view of two spinners and the flight paths and a possible distribution curve generated thereby in accordance with the present invention;

FIG. 13 is a partial, perspective view of an embodiment of a spinner and gradual release edge capable of generating the distribution curve of FIG. 12 in accordance with the present invention;

FIG. 23 is a perspective view of the spinner of FIG. 22 with the guard deflected to the activated position in accordance with the present invention;

DETAILED DESCRIPTION OF THE PREFERRED EMBODIMENTS

Figure 1:
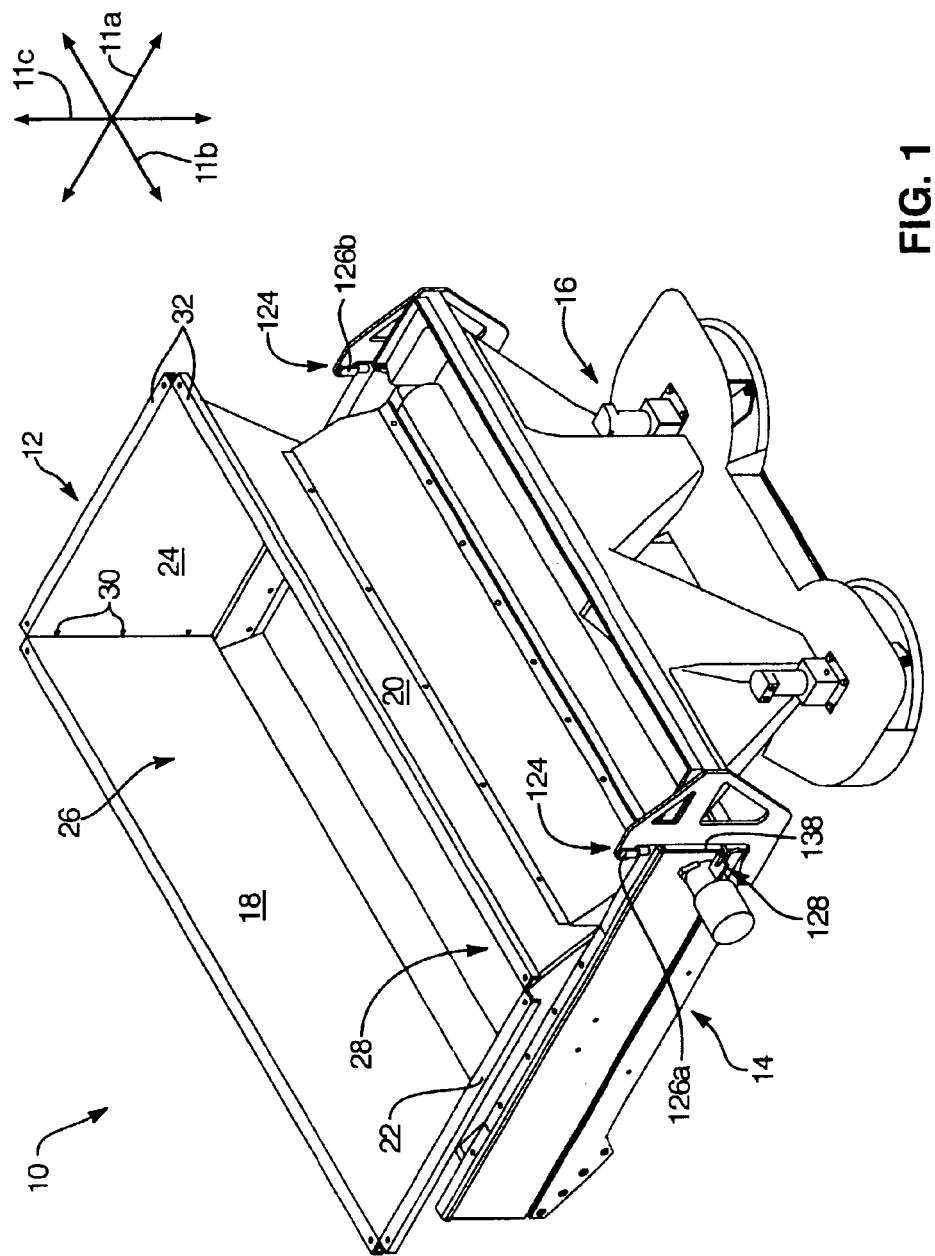
FIG. 1 is a perspective view of a combination drop and broadcast spreader in accordance with the present invention with the distributor attachment in place.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 28, is not intended to limit the scope of the invention, as claimed, but is merely representative of certain embodiments of apparatus and methods in accordance with the invention.

The embodiments of systems in accordance with the invention will be best understood by reference to the drawings, wherein like parts are designated by like numerals throughout. Those of ordinary skill in the art will, of course, appreciate that various modifications may easily be made without departing from the essential characteristics of the invention Referring to FIG. 1, in describing a spreader 10 in accordance with the present invention, it may be advantageous to first define longitudinal 11a, lateral 11b, and transverse 11c directions positioned to be substantially mutually orthogonal. In general, the longitudinal direction 11a will be aligned with the horizontal direction of travel of the spreader 10 in operation. The lateral direction 11b will extend from side to side. By default, the transverse direction 11c will then be aligned with a direction close to vertical. All directions are with respect to the spreader 10, since ground may not be level.

The structures of a spreader 10 typically accomplish three basic functions. First, the material is stored. Second, the material is metered or parceled. Finally, the metered material is applied to a selected ground surface area. A spreader 10 in accordance with the present invention may be divided into componentry according to these three functions. For example, the storing may be accomplished by a hopper 12. The metering may be accomplished by a conveyor 14. And finally, the application to the ground surface may be accomplished by a distributor 16.

A hopper 12 in accordance with the present invention may have any suitable shape (e.g. round, rectangular, trapezoidal, etc.) for containing the material 36. In certain embodiments, a hopper 12 may include a front wall 18, a rear wall 20, a first side wall 22, and a second side wall 24. The walls 18, 20, 22, 24 may be arranged to form an open top 26 and an open bottom 28. In general, the walls 18, 20, 22, 24 may be formed of any suitable material and be connected in any suitable manner. For example, in certain embodiments, the walls 18, 20, 22, 24 are made of a polymer molded as a single piece. In another embodiment, the walls 18, 20, 22, 24 are constructed of sheet metal secured together by fasteners 30. Other suitable materials may include wood, reinforced polymer, and the like. Other suitable forming methods may include welding, snapping, glueing, and the like.

The walls 18, 20, 22, 24 may be formed to increase strength and rigidity while minimizing weight. For example, in one embodiment, sheet metal walls 18, 20, 22, 24 may have folds 32 bent therein to increase the section modulus. In other embodiments, ribs, corrugations, and the like may be employed.

Figure 2:
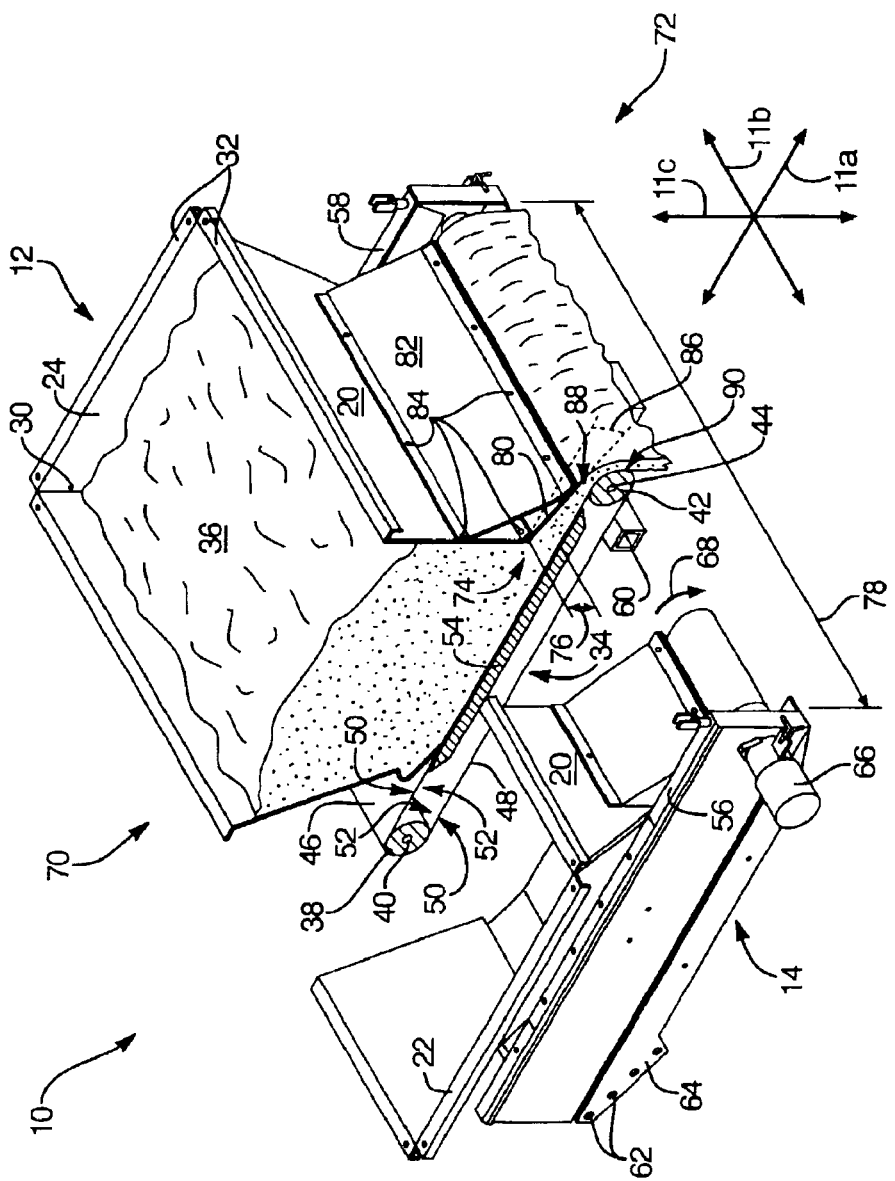
FIG. 2 is a perspective, partial cut-away of a combination drop and broadcast spreader in accordance with the present invention without the distributor attachment in place.

Referring to FIG. 2, a spreader is illustrated without the distributor 16 attached. In selected embodiments in accordance with the present invention, the hopper 12 may be secured above the conveyor 14 to deposit material 36 thereon under the impetus of gravity. In certain embodiments, the conveyor 14 may be positioned below the hopper 12 to form the base to the hopper 12. Thus, the hopper 12 may support a quantity of a material 36 in the longitudinal 11a and lateral 11b directions, while the conveyor 14 supports the material 36 in the transverse direction 11c.

A conveyor 14 may include a carrier 34. A carrier 34 in accordance with the present invention may be any suitable mechanism. For example, a carrier 34 may be formed of a chain, a rack, a belt, a link belt, decks, and/or platens. In selected embodiments, a carrier 34 may circulate around and be supported by a front roller 38 rotating about a front axis 40 and a rear roller 42 rotating about a rear axis 44. For convenience in discussion, in certain embodiments, a carrier 34 may be defined to have an upper half 46, a lower half 48, an outer surface 50, and an inner surface 52.

If a more flexible carrier 34 is used, a carrier support 54 may support the upper half 46 of the carrier 34 to resist sagging due to the weight of the material 36 resting thereabove. The front and rear rollers 38, 42 may be supported in their respective positions by first and second rails 56, 58 extending in the longitudinal direction 11a. Cross members 60 and other structural elements may be added as needed to provide sufficient rigidity and strength. U.S. Pat. No. 6,202,944 B1 (the '944 patent) issued to McCrory and entitled MATERIAL SPREADING APPARATUS is incorporated herein by reference. The '944 patent describes various belt and belt support configurations that may be applied to the present invention.

In general, a spreader 10 in accordance with the present invention may be propelled, towed, or otherwise moved by any suitable motivator or motive means. Thus, any structure necessary to provide a suitable interface with the motivator is considered to be within the scope of the present invention. For example, various apertures 62 and extensions 64 and other structures may be included as part of a spreader 10 in accordance with the present invention. The apertures 62 and extensions 64 may support securement of wheels, towing hitches, and the like. In other embodiments, the apertures 62 and extensions 64 support securement of the spreader 10 onto the bed of a vehicle to create a self-propelled spreader 10.

A driver 66 may be provided to generate motion of the carrier 34. In selected embodiments, such as those using a conveyor belt 34, the driver 66 may engage the rear roller 42 and generate a desired direction of rotation 68. In one embodiment, the direction of rotation 68 is selected to pull material 36 resting on the outer surface 50 of the upper half of the of the carrier 34 from a front end 70 to a rear end 72 of the spreader 10. Thus, when the driver 66 is activated, the material 36 may be pulled from the hopper 12 through a hopper exit 74 formed in the rear wall 20 of the hopper 12. In another embodiment, the material 36 may leave the hopper 12 under the impetus of gravity and be deposited on the carrier 34.

A hopper exit 74 in accordance with the present invention may have an exit height 76 and an exit width 78. The exit height 76 and width 78 may be selected to best accommodate the various compositions of the material 36 to pass therethrough. In selected embodiments, the exit width 78 roughly corresponds to the span of the carrier 34 in the lateral direction 11b.

In certain embodiments, a compression plate 80 may be secured proximate the hopper exit 74. In one embodiment, a compression plate 80 may secure to the rear wall 20 of the hopper 12 and extend towards the rear end 72 of the spreader 10. In selected embodiments, the rearward-most end of the compression plate 80 may be held in a desired location by a brace 82 forming a substantially rigid triangular cross section between itself, the rear wall 20, and the compression plate 80. Fasteners 84 may secure the compression plate 80, brace 82, and rear wall 20 respectively to one another in a desired location.

In selected embodiments, the compression plate 80 may slope downward in the transverse direction 11c as it extends rearwardly in the longitudinal direction 11a. In another embodiment, the compression plate 80 may simply slope toward the carrier 34, whatever direction that may be. The slope may be defined and quantified by a compression angle 86. The magnitude of the compression angle 86 may inversely correspond to a height of a metering port 88. That is, if the compression angle 86 is zero, then the height of the metering port 88 is the same as the height 76 of the hopper exit 74. If, on the other hand, if the compression angle 86 is ten degrees, then the metering port 88 will have a height less than the height 76 of the hopper exit 74. Thus, the compression plate 80 may act to compress the material 36 traveling on the carrier 34 before it can leave the metering port 88 and fall from the carrier 34 at the discharge pont 90 or dumping point 90. In embodiments where the carrier 34 is a conveyor belt 34, the dumping point 90 may be the point of belt inversion 90.

Figure 3:
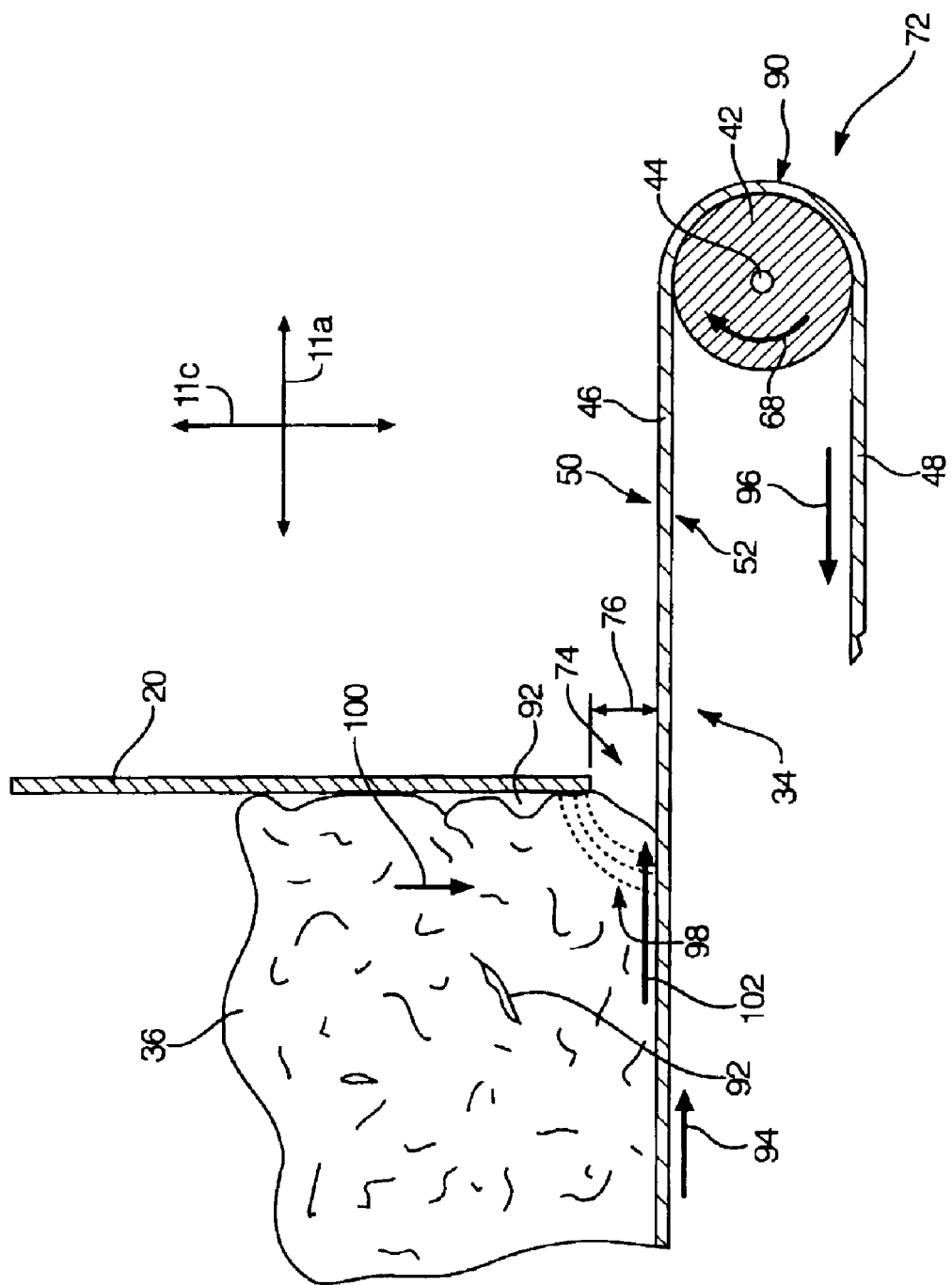
FIG. 3 is a partial, side, cut-away view of a hopper exit and substantially smooth carrier illustrating the bridging effect that may occur in the material to be distributed.

Referring to FIG. 3, any suitable material 36 may be a material 36 to be distributed in accordance with the present invention. Suitable materials 36 may include sand, gravel, soil, salt, de-icing pellets, seed, fertilizer, top-dressing, and the like. Top-dressing materials 36 that are used on sports turf and golf fairways and greens typically include some combination of sand, silt, clay, peat, lime, gypsum and/or soil.

When the moisture content of some materials 36 is high, as is often the case, the material 36 becomes cohesive and resistant to flow. This cohesiveness may cause the material 36 to trap air, forming voids 92, which may result in inconsistent metering. However, perhaps more significantly, this increase in cohesiveness greatly increases the shear modulus of the material 36. As a result, the material 36 resists exiting the hopper.

Depending on the height 76 of the hopper exit 74, the moisture induced cohesiveness may be sufficient to stop material 36 from exiting the hopper 12 entirely. Thus, the carrier 34 may advance 94 and retreat 96, without transporting any material 36. For example, in selected embodiments, where the hopper exit 74 also acts as the metering port, the hopper exit height 76 is relatively small. As a result, the cohesiveness may generate a bridging effect 98 which the weight 100 of the material 36 pressing down thereon is unable to collapse. Moreover, in embodiments where the carrier 34 aids in the removal of material 36 from the hopper 12, the friction force 102 between the moving carrier 34 and the material 36 is also unable to overcome the cohesive bridging effect 98.

Figure 4:
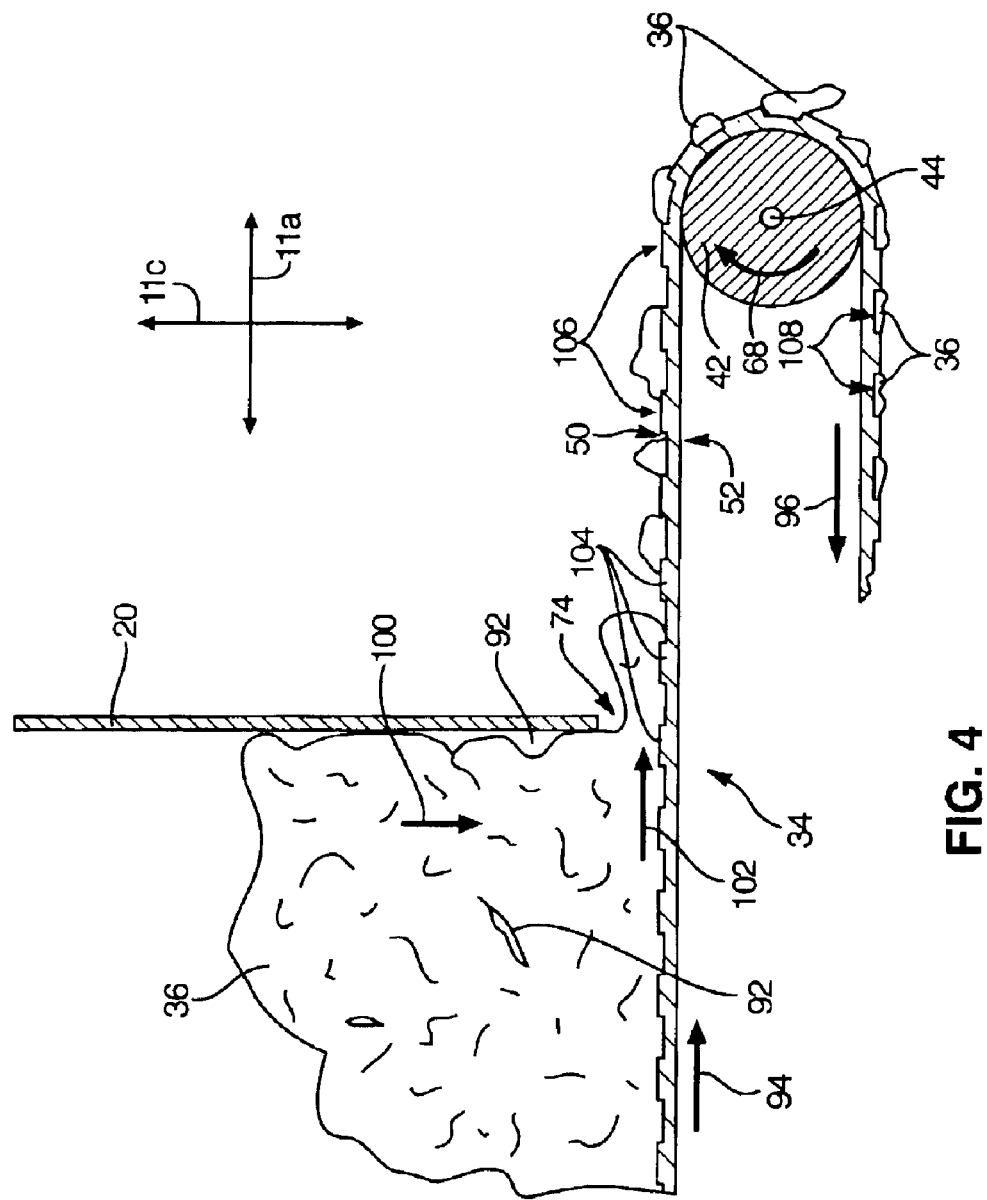
FIG. 4 is a partial, side, cut-away view of a hopper exit and carrier having a raised pattern illustrating clumping and filling of the recesses in the raised pattern by the material to be distributed.

Referring to FIG. 4, to increase the friction force 102 so that it may overcome the cohesive bridging effect 98, cleats 104 may be incorporated as part of the outer surface 50 of the carrier 34. However, depending on the consistency of the material 36 there may be significant disadvantages to the use of cleats 104. For example, the cleats 104 typically do not remove voids 92 from the material 36. Rather, the cleats 104 may even increase the occupancy of discontinuities 106 as the material 36 passed through the hopper exit 76. Moreover, often the reliefs 108 between the cleats 104 collect material 36 and after a short period of time fill, thus, nullifying the effect of the cleats 104. Due to the discontinuous nature of the outer surface 50 of the carrier 34, cleaning out the reliefs 108 can become a significant problem.

Figure 5:
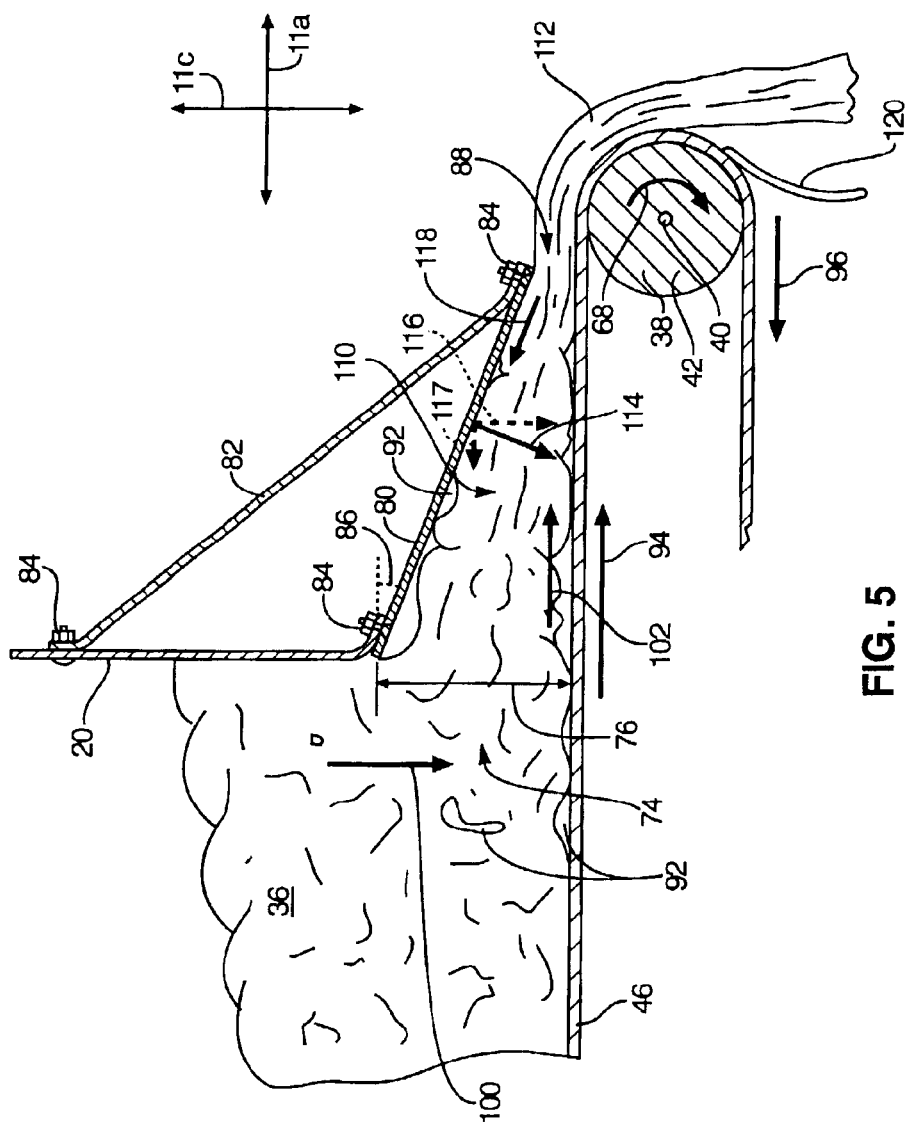
FIG. 5 is a partial, side, cut-away view of a hopper exit, compression plate, and substantially smooth carrier in accordance with the present invention illustrating metering of a material to be distributed.

Referring to FIG. 5, the cohesive bridging effect 98 weakens as the distance it must span increases. As a result, if the height 76 of the hopper exit 74 is sufficiently large, the bridging effect 98 will break down and cohesive material 36 may be drawn out of the hopper 12. However, a large hopper exit 74 causes additional challenges in that it may be difficult to meter the material 36 exiting therethrough. A compression plate 80 in accordance with the present invention addresses both difficulties by providing a hopper exit 74 with a large exit height 76 and a closely controlled, precise metering port 88.

For convenience of discussion, a compression zone 110 may be defined as the three dimensional volume bounded by the compression plate 80 and the upper half 46 of the carrier 34 in the transverse direction 11c and by the hopper exit 74 and the metering port 88 in the longitudinal direction 11a. However, it is readily understood that in certain embodiments, the directions used in defining the compression zone 210 may differ. The height 76 of the hopper exit 74 may be sufficiently large to overcome the cohesive bridging effect 98 and permit the material 36 to flow out. In other embodiments, the sufficiently large hopper exit 74 permits the friction force 102 of the carrier 34 to draw the material 36 out of the hopper exit 74 and into the compression zone 110.

Once inside the compression zone 110, the mechanical characteristics of the material 36 largely determine the dynamics that follow. For example, a relatively compressible material 36 containing voids 92 will gradually be compressed by the ever decreasing area imposed thereon by the compression angle 86 of the compression plate 80 until it reaches the metering port 88. As a result, the material 36 exits the metering port 80 as a substantially voidless, metered material 112. Interstitial voids between particles in compact contact are not "voids" in this context.

It is well known that the friction force between adjacent objects is equal to the force pushing the objects against each other (the normal force) times a coefficient of friction based on characteristics of the two abutting surfaces of the objects. Thus, frictional forces can be increased by increasing the normal force or by increasing the coefficient of friction between the opposing surfaces.

For example, a wedge with the high end placed against a door is ineffective as a doorstop. The weight (normal force) forcing the wedge against the floor is insufficient to generate the frictional forces necessary to stop the door from swinging. However, when the small edge is placed under the door, the incline pushes upward on the door which in turn pushes right back. This return force is transferred through the wedge to the floor surface, effectively creating a very large normal force. This normal force, even when multiplied by the same coefficient of friction as before, now creates a frictional force that easily holds the door in place. These principles of physics apply equally well to the compression plate 80 of the present invention.

In certain embodiments, the frictional force 100 applied by the carrier 34 to the material 36 outside of the compression zone 110 is a product of the weight 100 of the material 36 and a corresponding coefficient of friction. However, as the material 36 enters the compression zone 110, the compression plate 80 exerts a normal force 114 thereon. The component 116 of the normal force 114 acting in the transverse direction 11c adds with the weight of the material 36 to generate a much greater friction force 102 between the carrier 34 and the material 36. Thus, as the compression (normal force 114) of the compression plate 80 increase and tries to stop the advance 94 of the material 36, the frictional force 102 is likewise increased and, therefore, the material 36 keeps advancing 94 through the compression zone 110.

The transverse component 116 of the normal force 114 is inversely related to the compression angle 86. That is, the greater the compression angle 86, the less the transverse component 116 and the greater a longitudinal component 117 of the normal force 114. Thus, there is a value of the compression angle 86 at which point the compression plate 80 becomes more of a hindrance than a help. This value may vary depending on the characteristics of the material 36. In general, the lower the shear modulus of the material 36, the greater the value of the compression angle 86 may be.

An increase in the normal force 114 exerted by the compression plate 80 increases a parasitic frictional force 118 between the plate 80 and the material 36. This parasitic frictional force 118 typically acts in opposition to the desired frictional force 102 between the carrier 34 and the material 36. However, this parasitic frictional force 118 may be controlled through selecting a material for the compression plate 80 that has a relatively low coefficient of friction with the material 36 to be distributed. Suitable materials may include a polished metal, polymer, reinforced polymer, and the like. In one embodiment, the compression plate is molded from polyethylene.

Parasitic frictional forces 118 may also be reduced by selective positioning of the fasteners 84. For example, the fasteners 84 may be countersunk bolts. In another embodiments, the fasteners 85 may be insert molded to permit one entire side of the compression plate 80 to be smooth and continuous.

Through the use of a compression plate 80 in accordance with the present invention, a carrier 34 having a substantially smooth outer surface 50 may transport and accurately meter even cohesive material 36. As a result, a scraper 120 may be employed to simply and effectively scrape all metered material 112 from the carrier 34. Thus, all the advantages of a substantially smooth carrier 34 may be enjoyed without the frictional limitations usually associated therewith.

Figure 6:
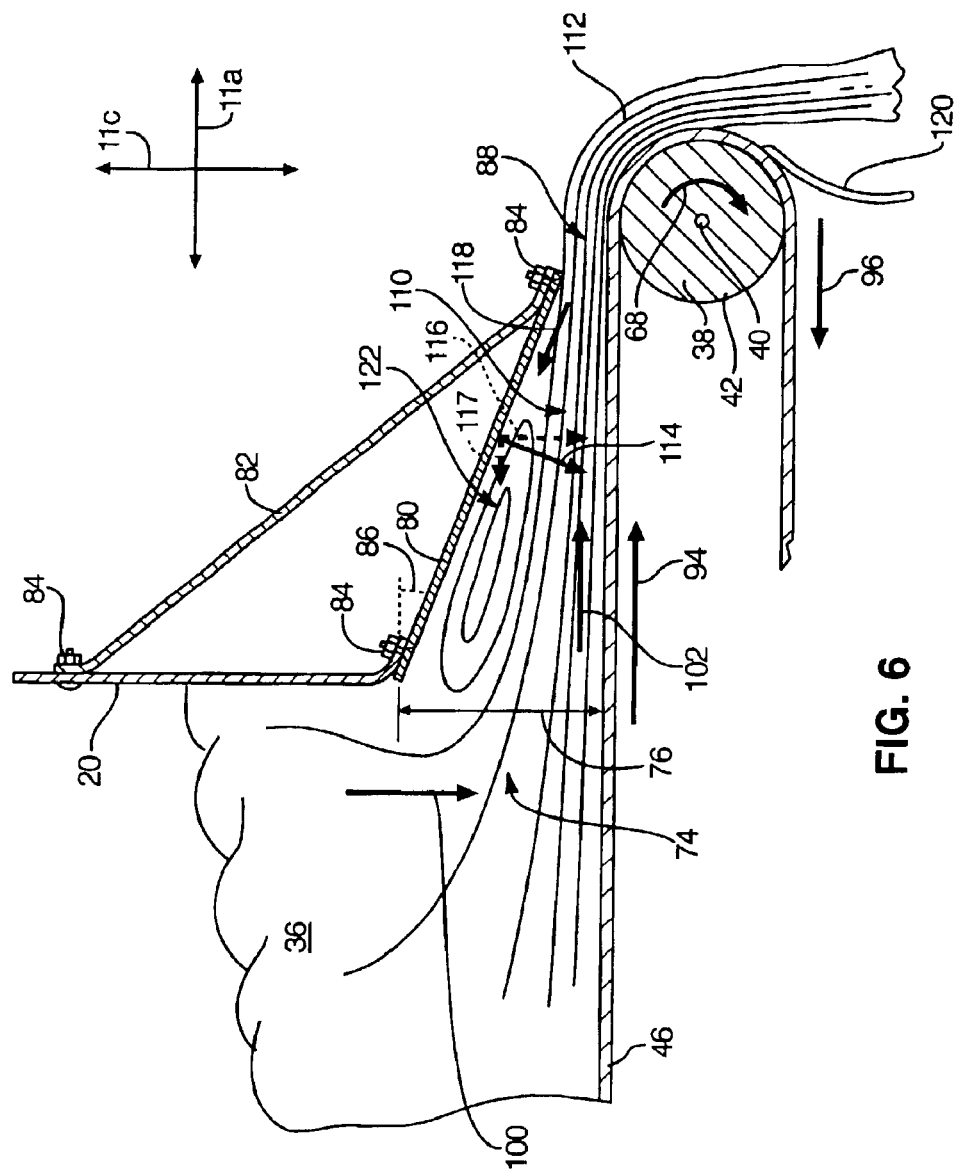
FIG. 6 is a partial, side, cut-away view of a hopper exit, compression plate, and substantially smooth carrier in accordance with the present invention illustrating metering of a material to be distributed.

Referring to FIG. 6, as mentioned hereinabove, once the material 36 enters the compression zone 110, the mechanical characteristics of the material 36 largely determine the dynamics that follow. For comparatively incompressible materials 36, the rate of exit from the metering port 88 is substantially equal to the rate of entrance into the compression zone 110. That is, the compression zone 110 has a much larger entrance (hopper exit 74) than exit (metering port 88). Therefore, all material 36 that enters does not immediately progress to the metering port 88. Instead, the compression zone 110 acts as an accumulator, collecting excess material 36 in a recirculation/stagnation zone 122.

Whether the excess material 36 in the compression zone 110 is recirculating or stagnant depends on the characteristics of the material 36. However, in both situations, the excess material 36 in the recirculation/stagnation zone 122 waits its turn to pass through the metering port 88. In such a situation, the compression zone 110 may act as an accumulator actively forcing, by both gravity and the normal force 118 of the compression plate 80, the excess material 36 waiting in the recirculation/stagnation zone 122 into voids in the outgoing material 36. Thus, a substantially continuous, metered material 112 exits though the metering port 88.

Figure 7:
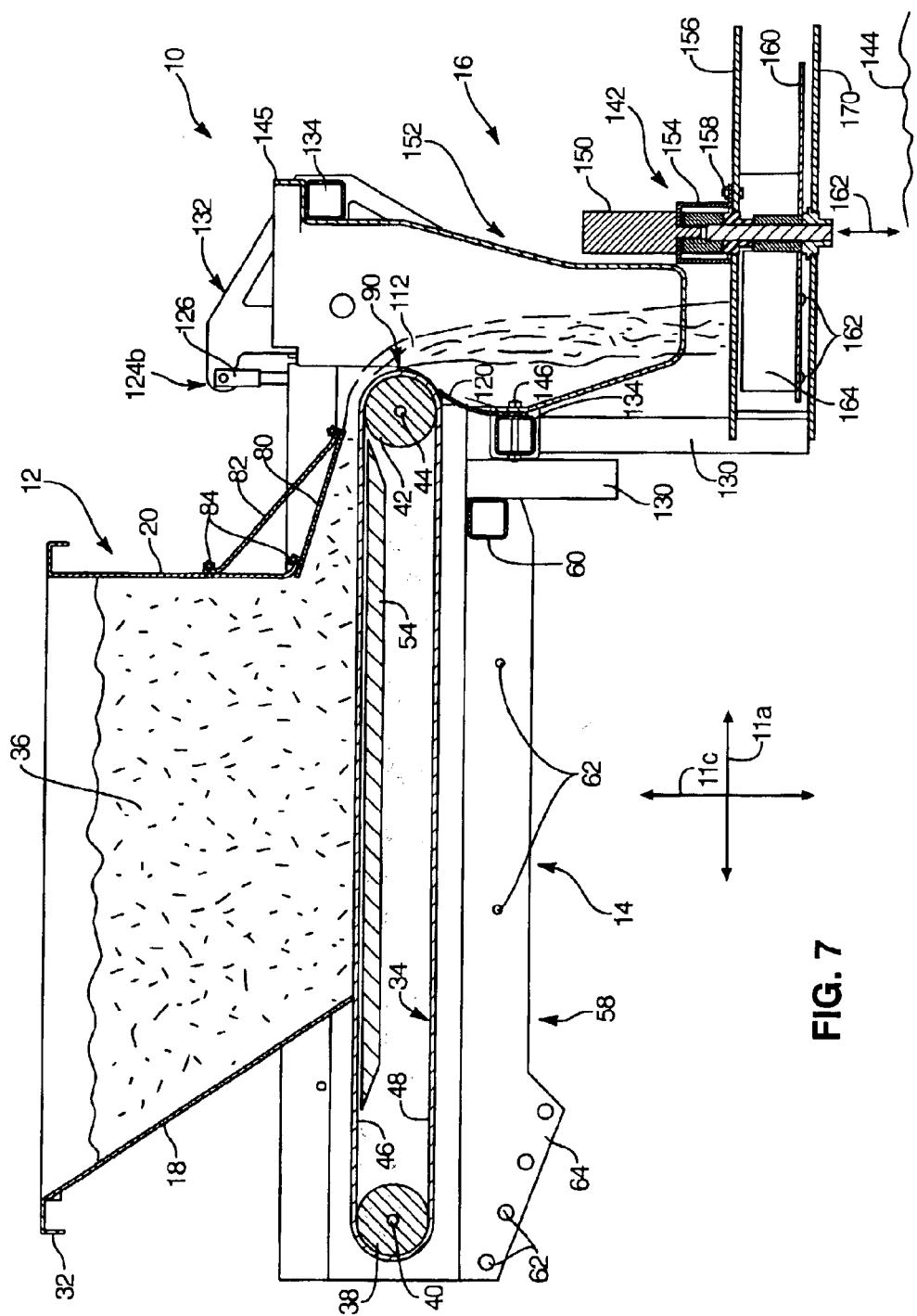
FIG. 7 is a side, cut-away view of a combination drop and broadcast spreader in accordance with the present invention illustrating metering of a material to be distributed.
Figure 8:
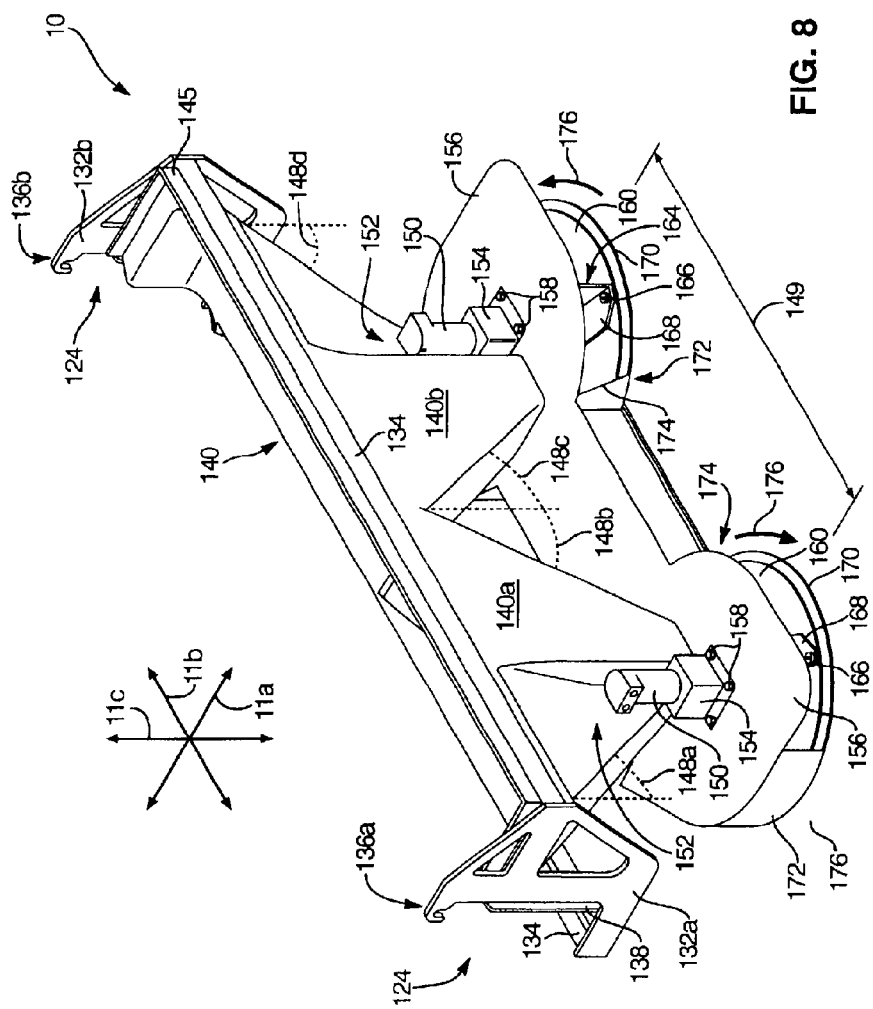
FIG. 8 is a perspective view of a distributor attachment in accordance with the present invention.

Referring to FIGS. 1, 7, and 8, in certain embodiments, it may be desirable to have a detachable distributor 16. Thus, the spreader 10 may act as both a drop spreader (without the distributor 16) and as a broadcast spreader (with the distributor 16). Likewise the broadcast spreader can be used alone. A detachable distributor 16 in accordance with the present invention may secure to the conveyor 14 (or any other suitable structure of the rest of the spreader apparatus 10). In selected embodiments, the distributor 16 secures to the conveyor 14 with an attachment engaging system 124.

In one embodiment, an attachment engaging system 124 in accordance with the present invention may include pivots 126a, 126b secured to the rails 56, 58 of the conveyor 14. Additional engagement mechanisms 128 may also be secured to the rails 56, 58. In certain embodiments, additional support structures 130 may be incorporate to support, engage, or otherwise aid in securement of the detachable distributor 16.

A distributor 16 in accordance with the present invention may have flanges 132a, 132b secured together by suitable cross members 134 as desired. The flanges 132a, 132b may have hooks 136a, 136b to engage the corresponding pivots 126a, 126b. Thus, once the hooks 136a, 136b engage the corresponding pivots 126a, 126b, the distributor 16 may be pivoted into proper alignment with the rest of the spreader apparatus 10. Flanges 132a, 132b may be formed with additional structures 138 corresponding to, and providing engagement with, the additional engagement mechanisms 128 to create a stable securement.

Referring to FIGS. 7 and 8, in certain embodiments, a distributor 16 may include a funnel 140 to direct metered material 112 to a spinner 142. The spinner 142 may also operate alone without the full metering system. Although material 112 may be unmetered, the term metered material 112 shall include herein all material 112 distributed when appropriate, such as when broadcast without being exactly metered. The spinner 142 may then propel the metered material 112 out over the ground surface 144. A funnel 140 in accordance with the present invention may have any suitable shape. For example, in selected embodiments, a distributor 16 may include more than one funnel 140 delivering metered material 112 to multiple spinners 142. In one embodiment, two symmetrical funnels 140a, 140b are formed as a single unit to simultaneously deliver metered material 112 to two spinners 142a, 142b.

A funnel 140 in accordance with the present invention may be formed of any suitable material. For example, a funnel 140 may be formed of a wood, metal, metal alloy, polymer, reinforced polymer, and the like. Factors that may be considered in selecting the material may be strength, durability, ease of manufacture, coefficient of friction with the metered material 112, and the like.

A funnel 140 may be formed in a manner compatible with the funnel material. In one embodiment, the funnel 140 may be formed as two symmetrical funnels 140a, 140b molded as a single unit from polyethylene. A shoulder 145 may be formed as part of the funnel 140 to support the funnel 140 on cross members 134 and the like. In certain embodiments, the funnel 140 may be directly bound to the support structure (flanges 132, cross members 134, and the like) of the distributor 16 in few locations, thus, permitting expansion and contraction due to thermal influences without warping, bending, cracking, and the like.

If desired, a scraper 120 may be incorporated as part of the distributor 16. In one embodiment, a scraper 120 is secured to a cross member 134 by fasteners 146, thus permitting the scraper to contact the carrier 34 after is has past the dumping point 90. In certain embodiments, a funnel 140 in accordance with the present invention may be formed with a funnel angle 148 selected to promote sliding of the metered material 112 therethrough. In certain embodiments, the geometries of the funnels 140a, 140b may be select to minimize the funnel angle 148. The funnel angle 148 may be minimized by spacing the spinners 142 a distance 149 selected to allow the four greatest funnel angles 148a, 148b, 148c, 148d to be substantially equal.

Spinners 142a, 142b in accordance with the present invention may be rotated by any suitable driver 150. Suitable drivers 150 may include motors, engines, cranks, power takeoffs, and the like. Other suitable drivers may include gears, sprockets, pulleys, shafts, and other mechanisms receiving their motion from a distant motive source or torque generator. In one embodiment, the driver 150 is a hydraulic motor.

On occasion, it may be desirable to position the driver 150 above the spinner 142. Such a placement may increase trailing clearance below the spinner 142. This additional trailing clearance may be particularly helpful to avoid spinner 142 contact with the ground while negotiating short, steep declines. Similar to dragging a car's rear bumper when traversing a deep gutter, contact between the spinner 142 and the ground is typically undesirable and may result in damage to either the ground, the spinner, or both. With a top-mounted driver 150, it may be desirable to form a clearance space 152 in a nearby funnel 140.

In selected embodiments, a mount 154 may secure the driver 150 to a top plate 156 of the spinner 142. Any suitable engagement, between the driver 150 and spinner 142 may suffice. If desired, fasteners 158 of any suitable type (e.g. bolts, rivets, welds, etc.) may be employed.

In certain embodiments, a spinner 142 in accordance with the present invention, may include a disk 160 rotating about a disk axis 162. Any suitable or beneficial alignment of the disk axis 162 may be utilized. In one embodiment, the disk axis 162 is aligned substantially with the transverse axis 11c.

Paddles 164 may be secured to the disk 160 to assist in propelling the metered material 112 therefrom. Paddles 164 may be formed with any suitable cross section or shape. The cross section or shape may be selected to assist the spinner 142 in engaging and propelling the metered material 112.

The disks 160, paddles 164, and componentry of the spinners 142 in general may be formed of any suitable material. Suitable materials may include a wood, metal, metal alloy, polymer, reinforced polymer, elastomer, combination thereof, and the like. Characteristics that may be taken into account when selecting component material may include strength, durability, abrasion resistance, frictional qualities, impact resistance, formability, cost, and the like. In one embodiment, the disk 160 and paddles 164 are formed of a metal.

Paddles 164 may be secured to the disk 160 in any suitable manner. For example, the paddles 164 may be welded, glued, bolted, snapped, slotted, pinned, wedged, keyed, or otherwise secured to the disk 160. In certain embodiments, the disk 160 and paddles 164 may be formed as an integral unit (i.e. molded or machined from a single piece of stock). In one embodiment, the paddles 164 are secured to the disk 160 by fasteners 166. A base 168 may be formed on the paddles 160 to assist the fasteners 166 in securing the paddles 164 to the disk 160. In certain embodiments, the angles and locations of the paddles 164 on the disk are adjustable to control distribution. Any suitable number of paddles 164 may be secured to a disk 160. The number of paddles 164 may be selected to promote a desired distributional pattern. In one embodiment, excellent and unexpected results were obtained when only two paddles 164 were secured to the disk 160. Broad, even distribution was obtained.

A top plate 156 in accordance with the present invention may extend over the disk 160 and paddles 164 to limit the directions in which the metered material 112 may be released from the disk 160. Moreover, the top plate 156 may prevent inadvertent insertion of a foreign object into the rotating spinner 142. If desired, a bottom plate 170 may provide an additional guard and protection for the spinner 142.

In selected embodiments, a shroud 172 may form a barrier surrounding a portion of the disk 160, thus, limiting release of the metered material 112 (e.g. metered, fed, grossly metered, delivered, etc.) to a desired location called the release edge 174. When the metered material 112 rotating on the disk 160 reaches the release edge, the outermost particles of the metered material 112 begin to exit the spinner 142 at their current tangent location and with a corresponding tangential velocity. The location of the release edge depends on the direction of rotation 176 of the disk 160. If the disk 160 were to rotate opposite to the direction of rotation 176, then the other end of the shroud 172 would become the release edge 174.

In embodiments including more than one spinner 142, intermediate regions 178 may connect the various spinners to increase strength, reduce vibration, and the like. For example, in one embodiment, a single top plate 156 extends over both spinners 142 while a single bottom plate 170 extends under both spinners 142. In such a case, the portions of the top and bottom plates 156, 170 extending between the spinners 142 may be considered a strengthening intermediate region 178.

Figure 9:
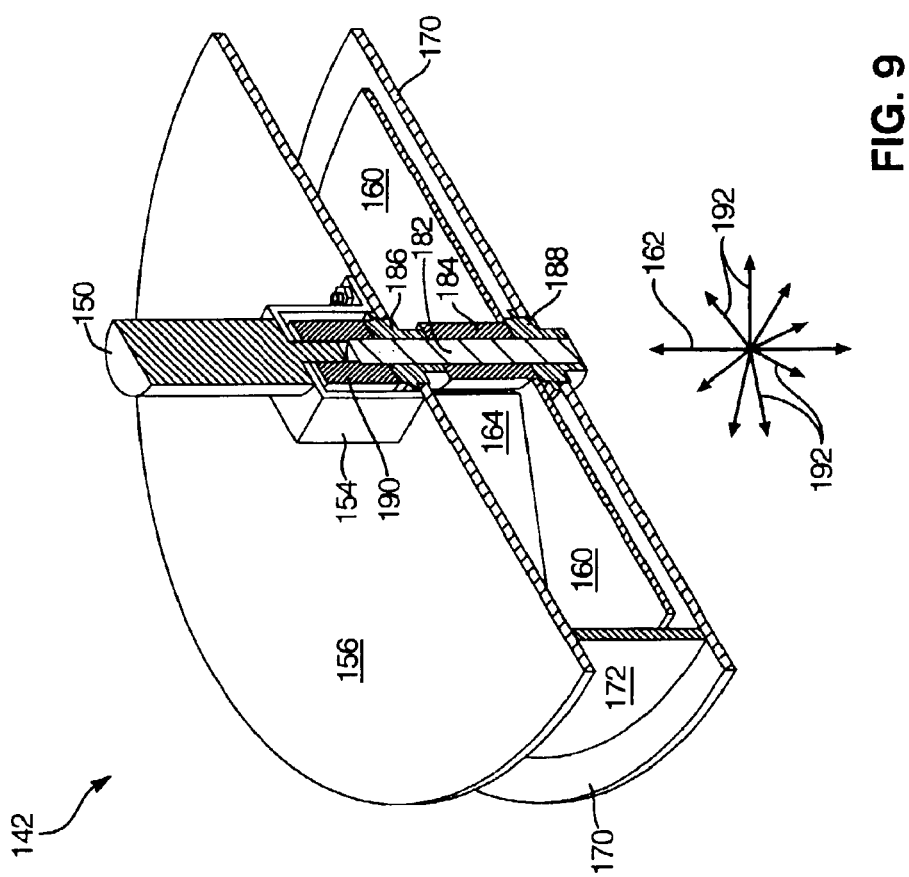
FIG. 9 is a perspective, cut-away view of a spinner in accordance with the present invention.
Figure 14:
FIG. 14 is a partial, perspective view of an alternate embodiment of a gradual release edge capable of generating the distribution curve of FIG. 12 in accordance with the present invention.
Figure 15:
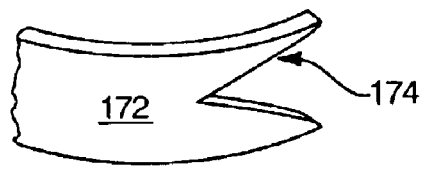
FIG. 15 is a partial, perspective view of an alternate embodiment of a gradual release edge capable of generating the distribution curve of FIG. 12 in accordance with the present invention.
Figure 16:
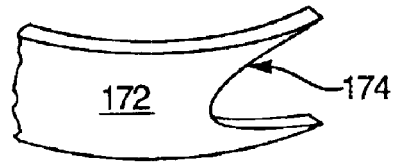
FIG. 16 is a partial, perspective view of an alternate embodiment of a gradual release edge capable of generating the distribution curve of FIG. 12 in accordance with the present invention.
Figure 17:
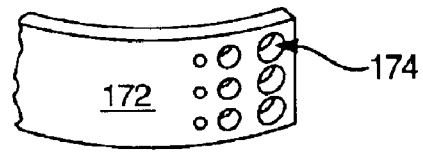
FIG. 17 is a partial, perspective view of an alternate embodiment of a gradual release edge capable of generating the distribution curve of FIG. 12 in accordance with the present invention.

Referring to FIG. 9, a disk 160 in accordance with the present invention may be secured to a shaft 182. In one embodiment, the disk 160 is rigidly connected to a bushing 184 sized to receive the shaft 182. If desired, the shaft 160 and bushing 184 may be keyed to prevent rotation therebetween. The shaft 182 may be rotatably held in place by an upper bearing 186 secured to the top plate 156 and by a lower bearing 188 secured to the bottom plate 170. A coupler 190 may transmit rotation from the driver 150 to the shaft 182.

Referring to FIG. 10, a spinner 142 may operate by applying a centrifugal acceleration to the metered material 112 deposited thereon by the funnel 140. The centrifugal acceleration acts on the metered material 112 to force the material 112 in a radial direction 192 along the paddles 164 until further progress is stopped by the shroud 172 at the disk edge 194. In such a position, the paddle 164 may be said to be "loaded."

When a loaded paddle 164 rotates past a release edge 174, the metered material 112 begins escaping the disk 160 under the impetus of the centrifugal acceleration. Each particle or clump of the metered material 112 escapes the disk 160 on a flight path 198. Each flight path 198 is in effect a tangential flight path 198 extending away from the disk 160 along one of an infinite number of tangent lines.

It may be helpful to distinguish between the release and the escape of the metered material 112. Release of a particle or clump of metered material 112 occurs when there is no longer a shroud barrier stopping travel in the radial direction 192 and preventing that particle or clump from flying off the rotating disk 160. Typically, release occurs as a loaded paddle 164 passes a release edge 174. Different particles and clumps of metered material 112 on a loaded paddle 164 may experience release at different times.

In contrast, escape is the moment when a particle or clump of the metered material 112 actually leaves the disk 160 and paddles 164. For particles and clumps of metered material 112 on a loaded paddle 164 at the disk edge 194, release and escape occur at roughly the same time. However, the escape of metered material 112 farther from the disk edge 194 may be delayed by several factors and occur sometime after release. To further illustrate, release is like the opening the starting gate granting a racehorse permission to start running, while escape is when the horse actual gets out of the chute.

Often, after release, the metered material 112 must wait in line behind other accumulated material 112 for its turn to escape. Metered material 112 nearer the disk edge 194 may escape first, followed by material 112 a little closer to the center of the disk (axis of rotation 162) until all the material 112 has escaped. Frictional forces between the metered material 112 and the disk 160 and paddles 164 may also affect the rate at which material 112 escapes, once it has been released. Other factors that may affect the rate at which material 112 is able to escape the disk 160 are the shear modulus of the material 112 as well as the angular velocity of the disk 160 and paddles 164. At slower speeds, friction against the disk 160 may be more of a delay factor, slowing radial travel.

The particular tangential fight path 198 taken by a particle or clump of the metered material 112 may be mapped by drawing a vector, tangent to the disk 160 and originating from the location that the particle or clump escapes the forces of the disk 160 and paddles 164. A release vector 199 may be defined as the direction and flight path 198 of a particle or clump of metered material 112 for which release and escape are substantially simultaneous.

A distribution curve 200 may be plotted to illustrate the distribution of the metered material 112 obtained by the spreader 10. A vertical axis 202 may represent the quantity of metered material 112 delivered. A horizontal axis 204 may represent the lateral location relative to a line of substantial symmetry 206. Often, the line of symmetry 206 corresponds to the path or direction of travel 208 of the spreader 10.

The configuration of the release edge 174 has a significant and calculable effect on the release and escape of the metered material 112 as well as the distribution curve 200 that is generated. Thus, various categories of configurations for release edges 174 may be established. Three such categories are abrupt release edges 174, gradual release edges 174, and periodic release edges 174.

Referring to FIGS. 10 and 11, the various categories of release edges 174 may be distinguished by the release vectors 199 that each respective release edge 174 generates. For example, the release vectors 199 of an abrupt release edge 174 all occupy a single, tangent plain 210. Thus, all release vectors 199 for an abrupt release edge 174 point in the sample direction. The distribution curve illustrated in FIG. 10 is typical of an abrupt release edge 174.

Since the release vectors 199 of an abrupt release edge 174 point in the same direction, the majority of the particles and clumps of metered material 112 escape on flight paths 198 very near the tangent plane 210 containing the release vectors. Thus, a maximum 212 distribution, corresponding to predominant flight path (near tangent plane 210), forms in the distribution curve 200.

It may be noted that not all escaping particles and clumps of the metered material 112 follow the path 198 indicated by the release vectors 199. As mentioned hereinabove, waiting in line, friction forces, shear modulus, and the like may delay the escape of some particles and clumps until only more laterally directed flight paths 198 are available. However, due to the magnitude of the centrifugal acceleration, that delay is typically relatively short. The short delay results in bunching of the utilized flight paths 198 close to the release vectors 199. As a result, very few particles and clumps of metered material 112 take the more laterally directed flight paths 198 to the lateral fringes 214

Referring to FIGS. 12 and 13, in gradual release edges 174, no single tangent plane 210 can contain all of the release vectors 199. Rather, each release vector 199 defines a distinct tangent plain 210. Thus, only an infinite number of tangent plains 210a, 210b, etc. can contain all of the release vectors 199 of a gradual release edge 174.

The distribution curve 200 illustrated in FIG. 12 is typical of a gradual release edge 174. The distribution of release vectors 199 through a large number of tangent plains 210a, 210b, etc. precludes the build-up of a large maximum 212. More of the metered material 112 escapes on flight paths 198 directed to the lateral fringes 214. Thus, a more even distribution curve 200 may be achieved. The edge fall-off 216 may be compensated by a slight overlap with the next, adjacent pass of the spreader 10.

Referring to FIGS. 13–17, various configurations may form gradual release edges 174. Any suitable configuration providing a gradual release of metered material 112 may be used for a gradual release edge 174. For example, a gradual release edge 174 may be a slope 174. The slope may extend from the top plate 156 to the bottom plate 170 or vice versa. The angle 216 of the slope 174 may correspond to the distribution desired. A more shallow angle 216 may be selected for a distribution extending more to the lateral fringes 214. Other suitable gradual release configurations may include forked, curved, and perforated edges 174.

Figure 18:
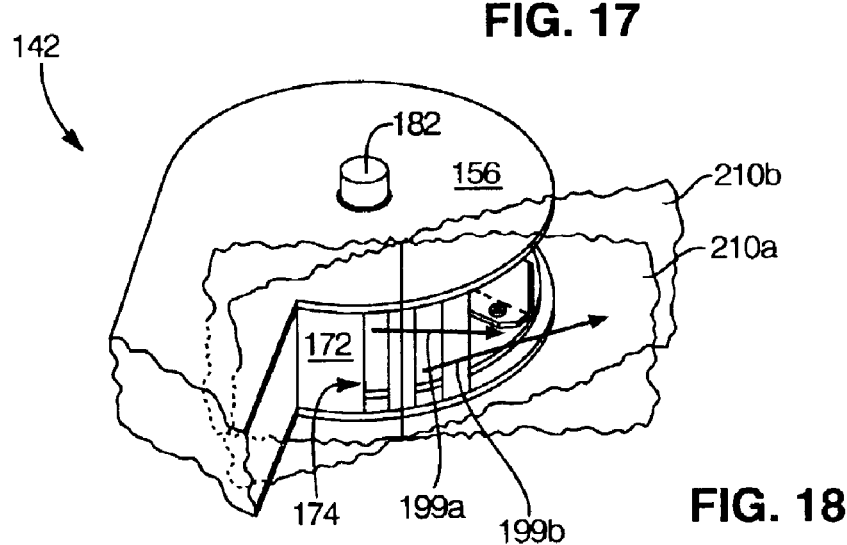
FIG. 18 is a partial, perspective view of an embodiment of a spinner and periodic release edge capable of generating the distribution curve of FIG. 12 in accordance with the present invention.

Referring to FIG. 18, in certain embodiments, a periodic release edge 174 may be employed. A periodic release edge 174 may comprise several abrupt release edges 174 formed in series. Thus, the material 112 is released then contained, released then contained until the desired distribution curve 200 is achieved. The spacing between the various segments of the shroud 172 may be selected to permit some, but not all of the metered material 112 to escape. Thus, the periodic release edge 174 has the effect of stringing out the escape of metered material 112.

Similar to the gradual release edge 174, with a periodic release edge 174, no single tangent plane 210 can contain all of the release vectors 199. That is, while the release vectors 199 associated with a particular release edge 174a may occupy one plain 210a, the release vectors 199 associated with another release edge 174b will occupy a distinct plain 210b. Thus, the number of tangent plains 210a, 210b, etc. may correspond to the number of the release edges 174a, 174b, etc. placed in series.

In selected embodiments, release edges 174 in accordance with the present invention may be formed as inserts so that with minimal manipulation, release edges of various sizes, shapes, and configurations may be employed. For example, a spinner 142 may be formed to accept inserts in the form of abrupt, gradual, and periodic release edges 174. In another embodiment, a spinner 142 may be configured to receive various shaped gradual release edges 174. In one embodiment, a spinner 142 may receive sloped, gradual release edges 174 of varying slope angle 216 to accommodate a variety of metered materials 112. In certain embodiments, a slope 174 may be adjustable to provide various slope angles 216 within a single device. Likewise, in certain embodiments, the circumferential location of the end of the shroud 172 may be selected or adjusted to vary the amount and distribution of material 112 dispensed. The actual length of the shroud 172 may be adjustable in a single device.

Figure 19:
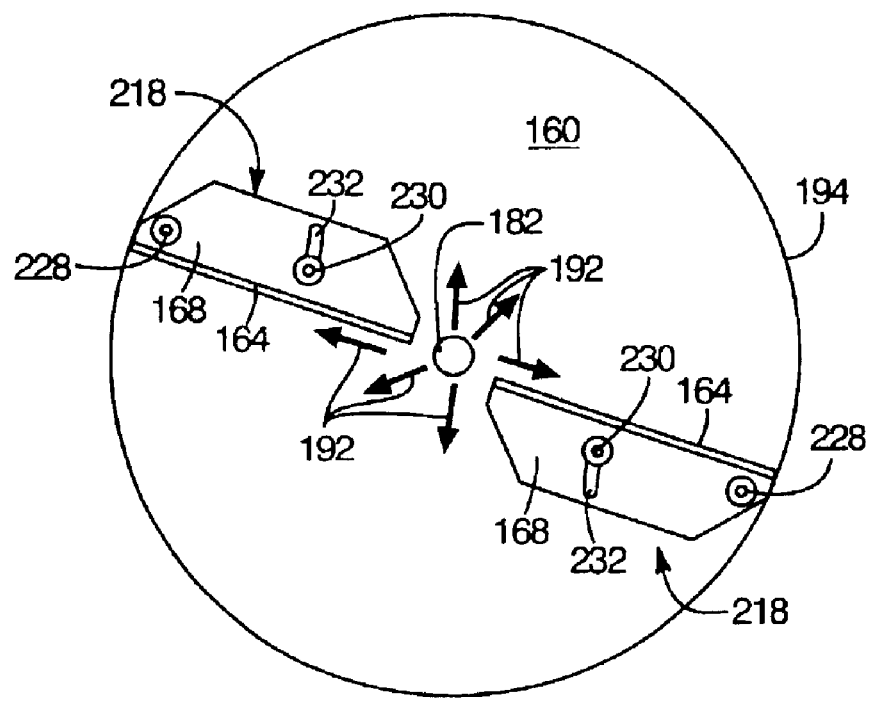
FIG. 19 is a top view of a disk with adjustable paddles in accordance with the present invention, illustrated with the paddles adjusted to a paddle angle of zero.
Figure 20:
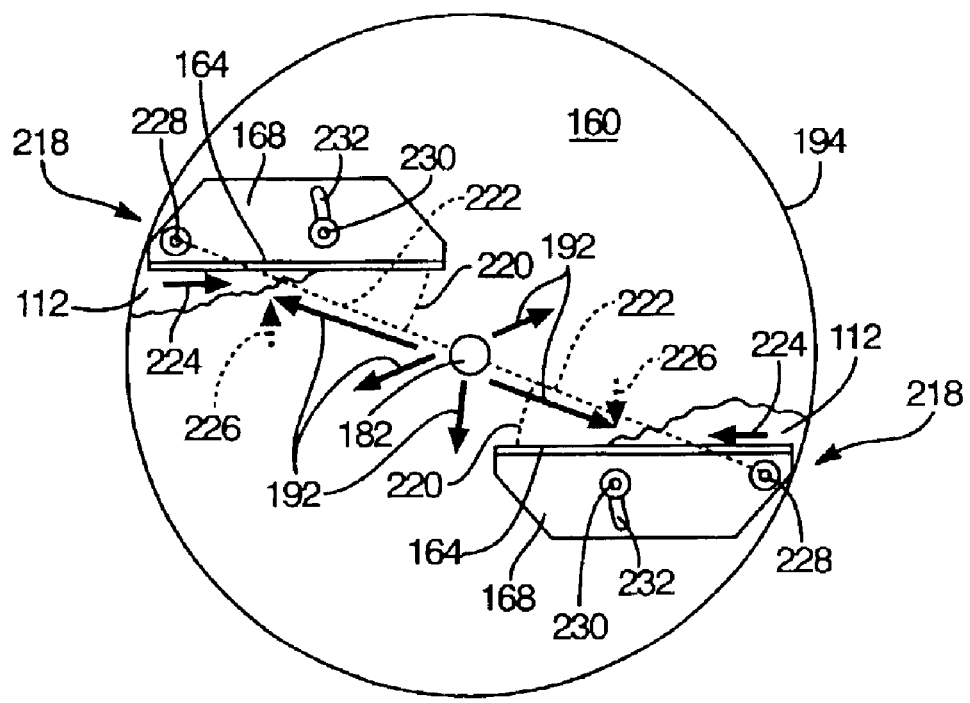
FIG. 20 is a top view of a disk with adjustable paddles and metered material in accordance with the present invention, illustrated with the paddles adjusted to a paddle angle greater than zero.

Referring to FIGS. 19 and 20, in certain embodiments, it may be advantageous to form paddles 164 that are secured to the disk 160 by an adjustment mechanism 218. The adjustment mechanism 218 may support securement of the paddles 164 to the disk 160 at a paddle angle 220 arbitrarily selected with respect to a radius 222 of the disk 160 to meet a particular distribution performance.

The adjustment range of the adjustment mechanism 218 may include any paddle angle 220 having a beneficial affect on the spreading of the various types of metered materials 112. In one embodiment, the adjustment mechanism supports a range of zero to twenty-five degrees of paddle angle 220. Experimentation has shown that larger paddle angles 220 may be helpful in producing a desired distribution when spreading a relatively dry metered material 112. Shallow paddle angles 220 have been shown effective for properly spreading metered materials 112 having a higher moisture content and more tendency to clump.

It is opined by Applicants that an increased paddle angle 220 may increase the frictional forces 224 between the metered material 112 and the paddle 164. That is, centrifugal acceleration acting on the metered material 112 may have a normal component 226, which in turn increases the frictional forces 224. This increase in the friction forces 224 may delay the escape of some of the metered material 112 a little longer after release, thus increasing the number of flight paths 198 directed towards the lateral fringes 214 of the distribution curve 200.

The adjustment mechanism may provide the various paddle angles 220 in any suitable manner. In certain embodiments, the adjustment mechanism 218 has a pivot 228 and clamp 230 sliding in a slot 232. The slot 232 may define the range of the paddle angles 220. The clamp 230 may secure the paddle at the desired location. In one embodiment, the clamp 230 is a bolt 230 that may be tightened to squeeze the paddle 164 against the disk 160. In selected embodiments, the bottom plate 170 may be modified or even omitted to provide a user with access to the clamp 230 to easily and quickly change the paddle angle 220.

Figure 21:
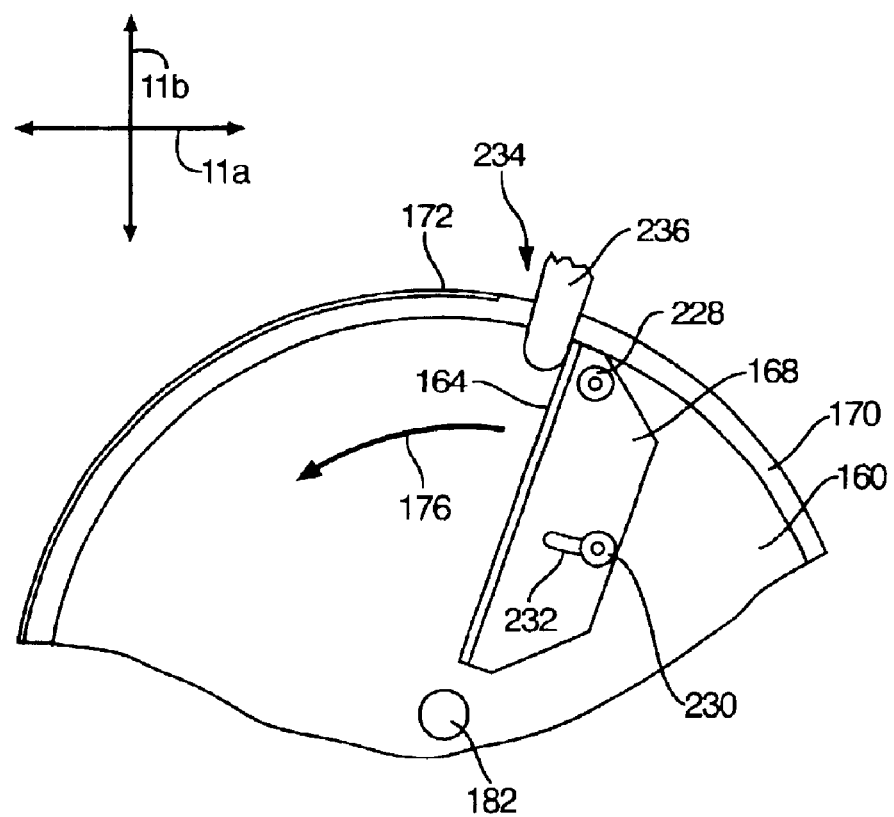
FIG. 21 is a top, cut-away view of a spinner illustrating a pinch point between a paddle and shroud.

Referring to FIG. 21, after a paddle 164 is emptied, it typically passes again behind the shroud 172. The location where a paddle 164 passes behind a shroud 172 may result in a dangerous pinch point 234. That is, a foreign object 236 may inadvertently be introduced between the rotating paddle 164 and the shroud 172. The speed and inertia of the rotating disk 160 and paddle 164 may damage the foreign object 236, the spinner 142 itself, the shroud 172, or any combination thereof. A foreign object 236 such as a finger or toe may even be severed at the pinch point 234.

Figure 22:
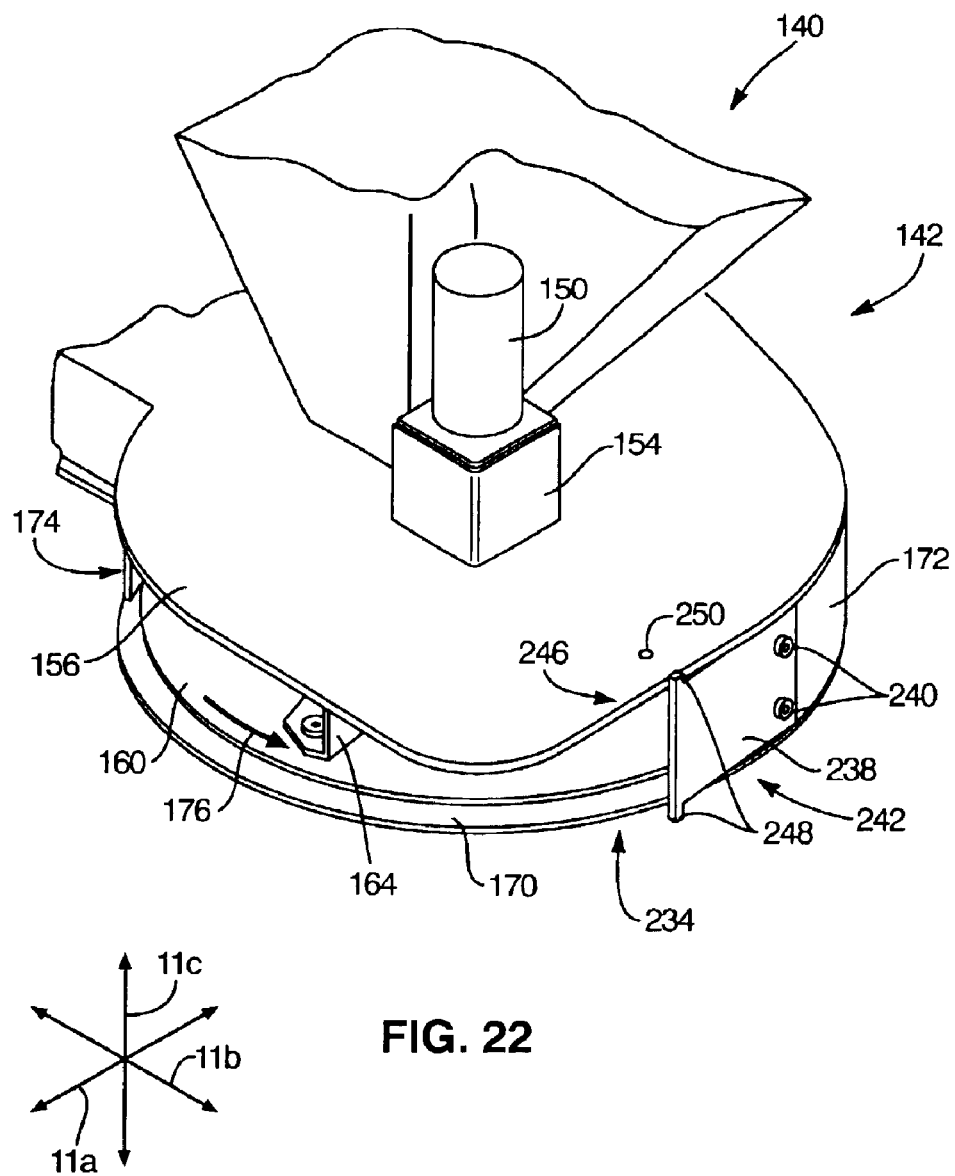
FIG. 22 is a perspective view of a spinner with a guard extending therefrom in a natural position in accordance with the present invention.

Referring to FIGS. 22–23, in certain embodiments in accordance with the present invention, a guard 238 may be added to the spinner 142 to eliminate or reduce the hazardous potential of the paddle/shroud pinch point 234. In selected embodiments, a guard 238 may be incorporated as part of the shroud 172. The guard 238 may be made from a material selected to cushion or ameliorate the pinching effect.

For example, a guard 238 may secure to the shroud 172 with fasteners 240 and extend away therefrom in a tangential, neutral position 242. When in use, the guard 238 may be deflected to an activated position 244 where the guard 238 occupies the pinch point 234. A guard 238 in accordance with the present invention, may be formed of any suitable material. In certain embodiments, flexible, shock absorbing materials may be used. Elastomeric materials and resilient polymers may function well in this application.

In certain embodiments, a detent mechanism 246 may be incorporated to hold the guard 238 in the activated position 244. In one embodiment, a detent mechanism 246 may include extensions 248 on the guard 238 corresponding to apertures 250 formed in the top and bottom plates 156, 170. Thus, when a foreign object 236 begins to be pinched at the pinch point 234, the detent mechanism 246 may release, permitting the guard 238 to compress or otherwise deflect and absorb the impact.

Figure 24:
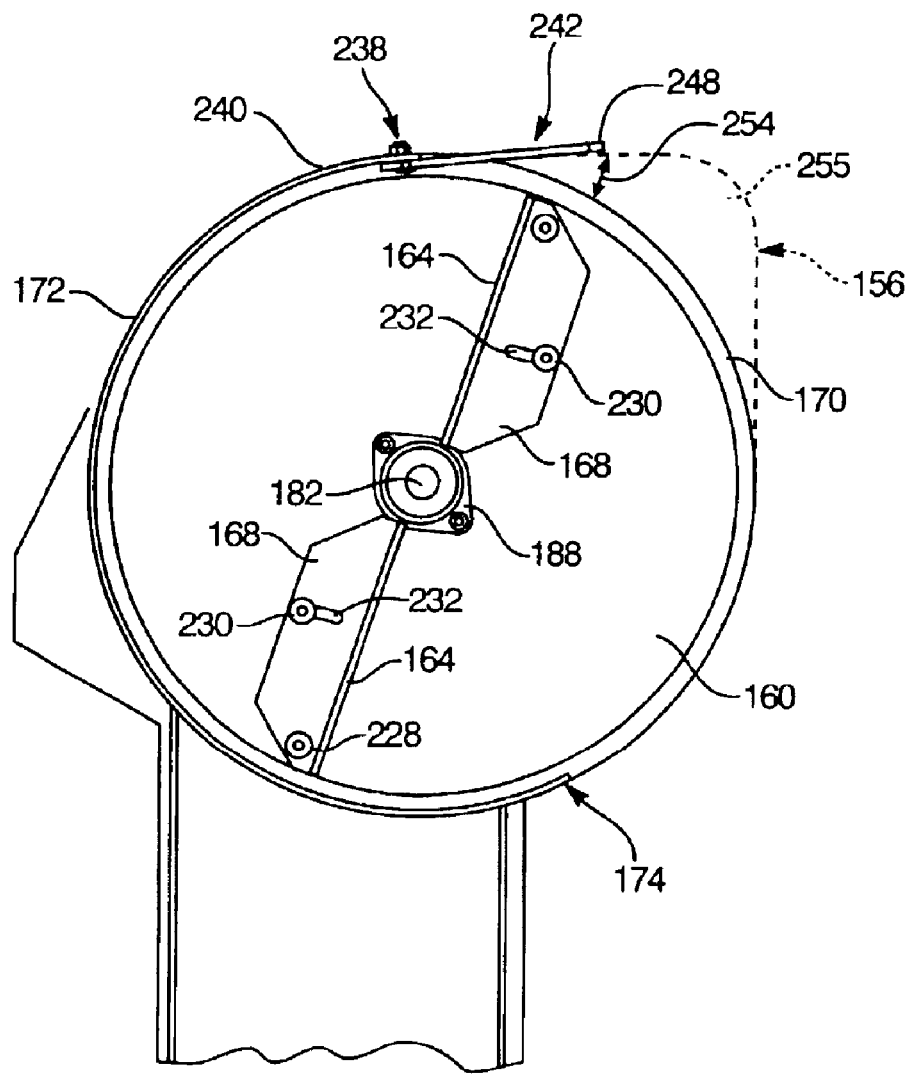
FIG. 24 is a top, cut-away view of a spinner illustrating a spacing to limit accessibility to the pinch point between a paddle and shroud in accordance with the present invention.

Referring to FIG. 24, in other embodiments, the guard 238 may simply extend from the spinner 142 in the neutral position 242. In general, the guard 238 may be positioned in any suitable orientation with respect to the spinner 142. In one embodiment, the neutral position 242 is arranged so that the guard 238 extends substantially straight, tangentially from the spinner 142. The guard 238 may effectively block entrance to the pinch point 234. Moreover, if a paddle 164 engages a foreign object 236, then the guard 238 may deflect to cushion or even eliminate the shearing effect.

In certain embodiments in accordance with the present invention, the probability of a pinch point 234 injury or damage may be lowered by making it more difficult for a foreign object 236 to be introduced into the pinch point 234. For example, a spacing 254 may be introduced between the exterior of the spinner 142 and the pinch point 234. The spacing 254 may be the result of the particular orientation of the guard 238 with respect to the pinch point 234. That is, in certain embodiments, the guard 238 may extend tangential from the spinner 142 to create the spacing 254.

In other embodiments, the spacing 254 may be generated by extending the top plate 156, bottom plate 170, or both. Various combinations of a guard 238 and extension of the plates 156, 170 may be used together to create the spacing 254. In one embodiment, the top plate 156 may extend to form a projection 255 while a guard 238 may extend along to the projection 255 to generate a selected spacing 254. If desired, the projection 255 may not be formed on the bottom plate 170 to preclude buildup of the metered material 112 thereon.

In selected embodiments, extensions 248 on the guard 238 may be included for purposes other than a detent mechanism 246. Rather, the extensions 248 may resist introduction of the guard 238 between the top plate 156 and the bottom plate 170. For example, the extensions 248 have a height greater than the vertical spacing between the top and bottom plates 156, 170. Thus, the extensions 248 may resist introduction of the guard 238 into the interior of the spinner 142 and facilitate removal of a foreign object 236 from the pinch point 234.

Figure 25:
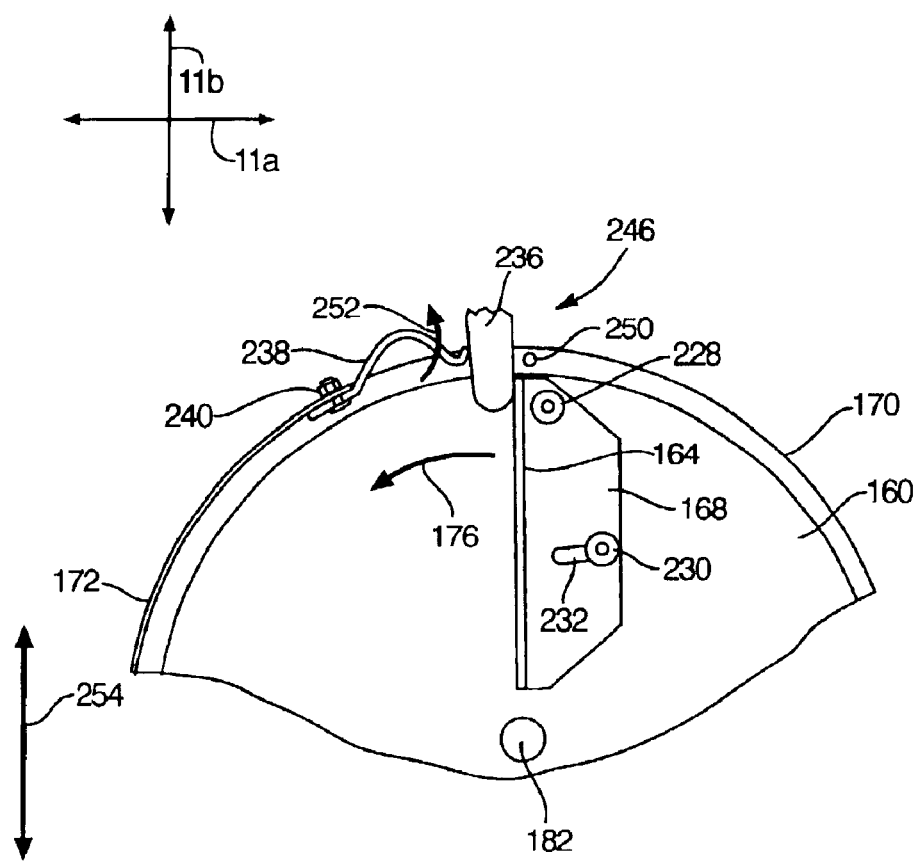
FIG. 25 is a top, cut-away view of the spinner of FIG. 22 illustrating the reaction of the guard to the pinching of a foreign object in the pinch point in accordance with the present invention.

Referring to FIG. 25, in certain embodiments, once the detent mechanism 246 is released, the guard 238 illustrated has a tendency to return to its neutral position 242. In other embodiments, the guard 238 begins in the neutral position 242 and deflection therefrom tends to be resisted by the resiliency of the guard 238. In either case, the resilience urging the guard 238 to return to the neutral position 242 may generate a restoring force 252 positioned to urge the withdrawal of the foreign object 236 from the pinch point 234. In such an embodiment, the guard 238 may thus simultaneously absorb impact and urge or assist removal of the foreign object 236 from the pinch point 234.

Figure 26:
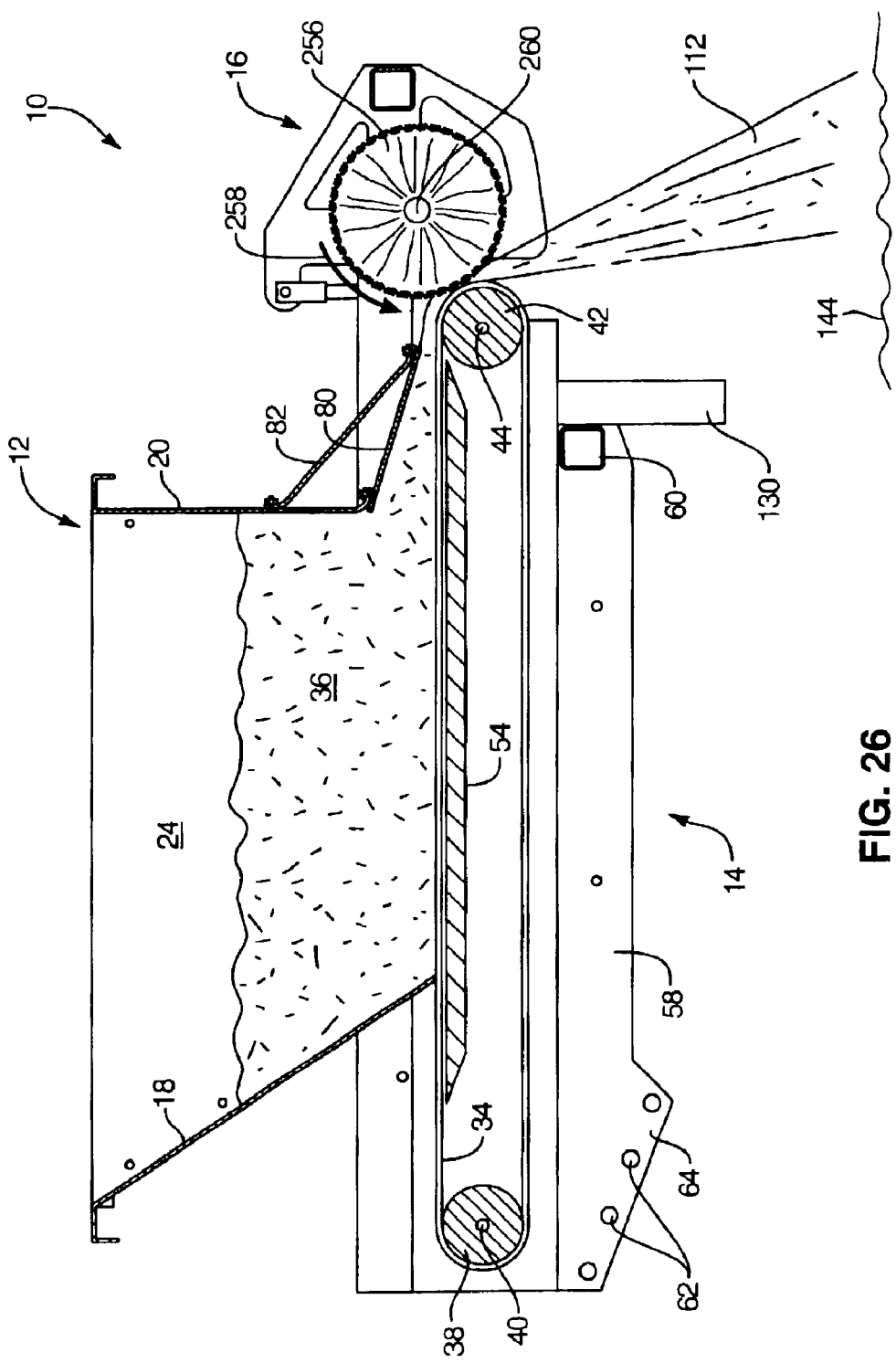
FIG. 26 is a side, cut-away view of a spreader employing a roller brush distributor in accordance with the present invention.

Referring to FIG. 26, principles of the present invention may be applied to all kinds of spreaders 10. While emphasis has been placed on drop spreaders, broadcast spreaders, and combinations thereof, various types of distributors 16 may be incorporated within the scope of the present invention. For example, in certain embodiments, a roller brush 256 may be used. The roller brush 256 may be driven in a rotational direction 258 about an axis 260 extending in the lateral direction 11b so as to propel the metered material 112 onto the ground surface 144.

Figure 27:
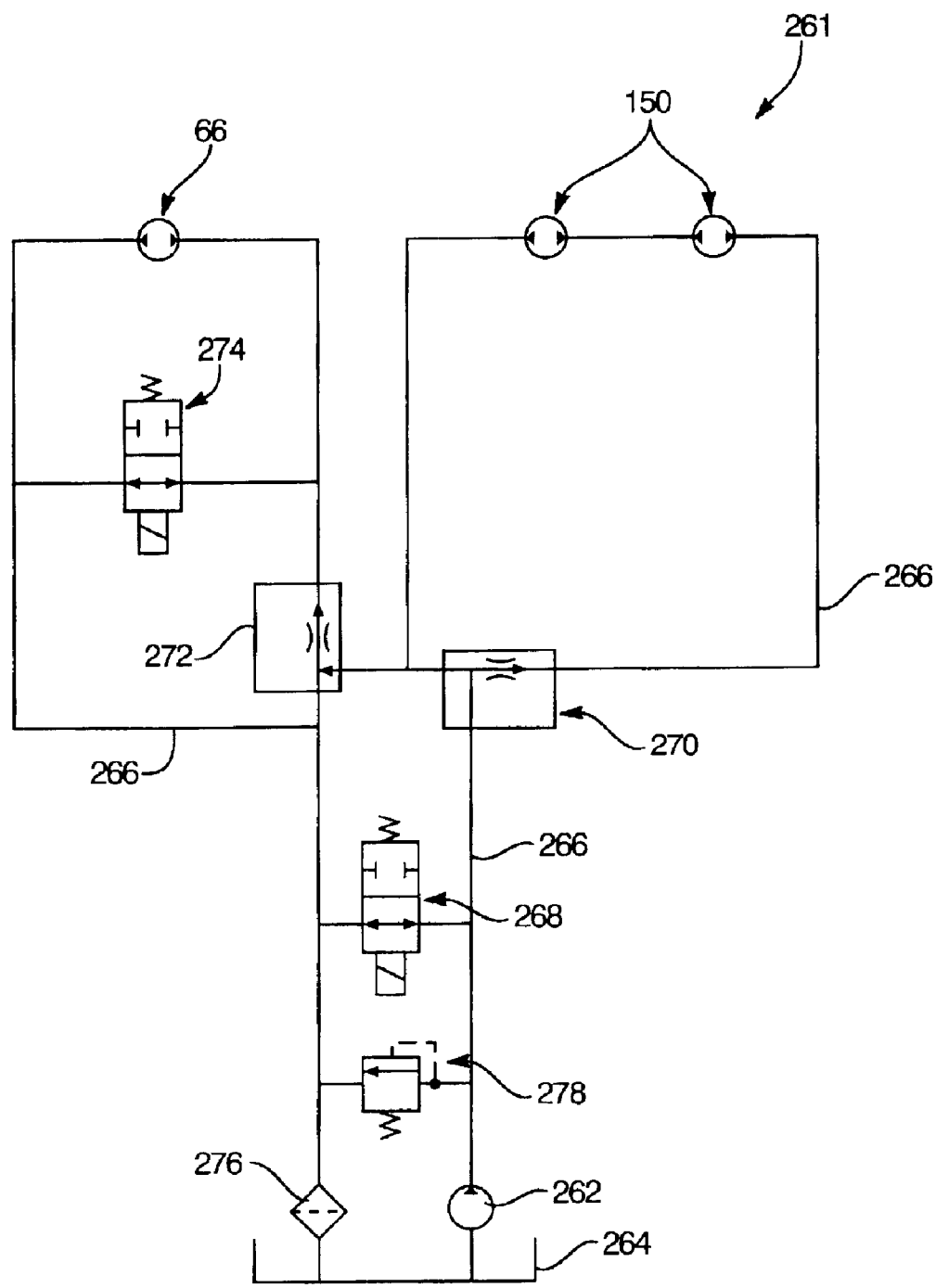
FIG. 27 is a schematic of an embodiment of a hydraulic power system for powering a combination drop and broadcast spreader in accordance with the present invention.

Referring to FIG. 27, the various components of the present invention may be urged in any suitable manner. Suitable power systems may be electric, hydraulic, pneumatic, internal combustion, and/or human. Additionally, power may be derived from other sources. For example, rotational motivation may be diverted from a power take off or from the rotation of the wheels of a spreader 10 as it is towed.

In certain embodiments, a hydraulic system 261 may be used. Various hydraulic designs may be used and still accomplish the same end result. In one such design, a pump 262 may extract fluid from a reservoir 264 and urge the fluid into hydraulic lines 266. When a solenoid valve 268 or other type of valve 268 is properly positioned, the pump 262 may push fluid through a flow control valve 270. The flow control valve 270 may variably control the amount of fluid traveling to, and thus the rotational speed of, various hydraulic motors 150. The number of motors 150 selected may correspond to the number of spinners 142, roller brushes 256, or the like used by the spreader 10.

Once the fluid has passed through the motors 150, it may be reunited with the excess from the flow control valve 270 and enter a second flow control valve 272. If a second solenoid valve 274 is properly aligned, the fluid metered from the second flow control valve 272 may variably control the amount of fluid traveling to, and thus the rotational speed of, a second motor 66. The second motor 66 may provide the necessary motivation for the carrier 34. Fluid leaving the second motor 66 may then reunite with the excess from the second flow control valve 272 and return to the reservoir 264 by passing through a filter. A pressure relief valve 278 may be added to protect the hydraulic system from over-pressure.

Figure 28:
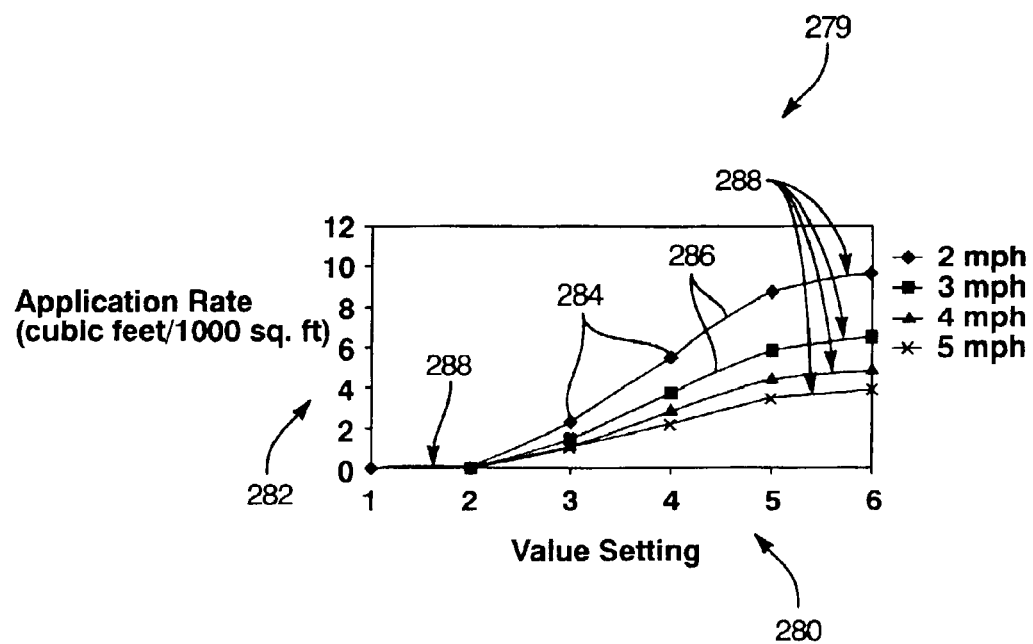
FIG. 28 is a chart plotting application rate as a function of carrier speed, as controlled by various valve settings, and spreader speed in accordance with the present invention.

Referring to FIG. 28, the performance of a spreader 10 in accordance with the present invention may be illustrated in a chart 279 to provide a user with useful information. The application rate for the present invention may be controlled by manipulating two variables, the speed of the carrier 34 and the speed of the spreaders.

For example, with a hydraulic power system 261, when the first control valve is fixed at a particular setting, various settings of the second flow control valve 272 controlling the speed of the carrier 34 may be plotted on the horizontal axis 280. The vertical axis 282 may be scaled to represent the application rate of the metered material 112. Data points corresponding to the application rate at various pairings of second flow control valve 272 settings and speed of a spreaders may be plotted. Curves 286 may connect the data points corresponding to a particular speed of a spreader.

When a user desires to apply material 112 at an application rate of four cubic feet per 1000 square feet of ground surface 144, the user may set the second flow control valve 272 at three and a half and drive the spreader 10 at two miles per hour. Alternatively, the user may set the second flow control valve 272 at approximately five and drive the spreader 10 at four miles per hour. Various other combinations may also achieve the same application rate. Thus, the user by simply knowing and controlling two variables, may determine the rate at which the material 112 is being applied.

The relatively flat regions 288 on the plotted curves 286 are characteristic of a particular hydraulic power system 261 and may not be present when other power systems 261 are used. That is, a certain amount of fluid flow is required for the carrier 34 to start motion. This threshold in the illustrated example corresponds to a second flow control valve 272 setting valve of two. Similarly, a second flow control valve 272 setting valve of five and above does not significantly change the speed of the carrier 34. A setting of five must be near the maximum throughput of the second control valve 272. Thus, it may be useful to plot a chart 279 for each power system 261 having significantly different operating parameters.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. An apparatus for distributing a particulate material, the apparatus defining an axial direction and radial direction comprising:
    a disk rotatable about an axis aligned with the axial direction and having an upper surface extending substantially radially from the axis;
    a driver operably connected to rotate the disk about the axis;
    a paddle secured to the upper surface of the disk to extend therefrom in the axial direction and rotate therewith, the paddle having a first end and a second end and being aligned to rotationally engage the particulate material directed thereto and generate a centrifugal acceleration therein; and
    an adjustment mechanism providing securement of the paddle to the disk, and comprising a pivot pivotably connecting the first end of the paddle to the disk, the adjustment mechanism being adjstable to provide secured alignment of the paddle at a selected angle with respect to a radius of the disk, the angle being selected to slow the centrifugal release of the particulate material from the apparatus.

2. The apparatus of claim 1, wherein the adjustment mechanism further comprises a clamp selectively securing the second end of paddle to the upper surface of the disk.

3. The apparatus of claim 2, wherein the paddle includes a slot corresponding to the clamp, the slot providing a continous range of securement angles of the paddle with respect to a radius of the disk.

4. The apparatus of claim 3, wherein the continuous range of securement angles extends from a minimum angle of about zero degrees to a maximum angle of about twenty-five degrees from a radius of the disk.

5. The apparatus of claim 1, further comprising a shroud providing a gradually decreasing barrier to radial movement of the particulate material from the apparatus.

6. The apparatus of claim 5, wherein the shroud has a barrier portion and substantially precludes centrifugal release of the particulate material from the apparatus along the barrier portion.

7. The apparatus of claim 6, further comprising a release portion characterized by an opening in the shroud for centrifugal release of the particulate martial therethrough.

8. The apparatus of claim 7, wherein the shroud includes a release edge bounding the barrier portion and the release portion.

9. The apparatus of claim 8, wherein the release edge defines a gradually decrease of the barrier, permitting preferential centrifugal release of the particulate material based on the axial position thereof.

10. The apparatus of claim 9, wherein the release edge is a diagonal edge extending axially and circumferentially.

11. The apparatus of claim 1, further comprising a second paddle secured to the upper surface of the disk to extend therefrom in the axial direction and rotate therewith, the second paddle aligned to rotationally engage the particulate material directed thereto and generated a centrifugal acceleration therein.

12. The apparatus of claim 11, wherein the first and second paddles are positioned on the disk to balance rotation of the apparatus about the axis.

13. The apparatus of claim 12, further comprising a third paddle, secured to the upper surface of the disk to extend therefrom in the axial direction and rotate therewith to rotationally engage the particulate material directed thereto and generate a centrifugal acceleration therein.

14. The apparatus of claim 13, wherein the first paddle, second paddle, and a third paddle are positioned on the disk to balance rotation of the apparatus about the axis.

15. An apparatus for distributing a particulate material, the apparatus defining an axial direction and comprising:
    a disk rotatable about an axis aligned with the axial direction and having an upper surface extending substantially radially from the axis;

a driver operably connected to rotate the disk about the axis;

a paddle having a first end and a second end and being secured to the upper surface of the disk to extend therefrom in the axial direction and rotate therewith;

a pivot securing the first end of the paddle to the disk; and a clamp selectively securing the second end of the paddle to the disk at multiple locations to provide multiple securement angles of the paddle with respect to a radius of the disk.

16. The apparatus of claim 15, wherein the paddle includes a slot corresponding to the clamp, the slot providing a continuous range of securement angles of the paddle with respect to a radius of the disk.

17. The apparatus of claim 16, wherein the continuous range of securement angles extends from a minimum angle of about zero degrees to a maximum angle of about twenty-five degrees from a radius of the disk.

* * * * *